(12) United States Patent
Motohashi

(10) Patent No.: US 7,979,645 B2
(45) Date of Patent: Jul. 12, 2011

(54) MULTIPROCESSOR SYSTEM FOR MEMORY MAPPING OF PROCESSING NODES

(75) Inventor: Hiroomi Motohashi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 400 days.

(21) Appl. No.: 12/232,098

(22) Filed: Sep. 10, 2008

(65) Prior Publication Data

US 2009/0077326 A1   Mar. 19, 2009

(30) Foreign Application Priority Data

Sep. 14, 2007  (JP) ................ 2007-240025

(51) Int. Cl.
*G06F 12/00* (2006.01)
(52) U.S. Cl. ........ 711/147; 711/153; 711/170; 711/202; 709/213; 712/29
(58) Field of Classification Search ............ 712/29; 709/213; 711/147, 202, 153, 170
See application file for complete search history.

(56) References Cited

U.S. PATENT DOCUMENTS

| 5,592,625 | A | * | 1/1997 | Sandberg ............ 711/147 |
| 7,219,343 | B2 | * | 5/2007 | Almeida et al. ............ 717/172 |
| 7,222,262 | B2 | * | 5/2007 | Prasadh et al. ............ 714/31 |
| 7,243,257 | B2 | * | 7/2007 | Kawaguchi ............ 714/8 |
| 2009/0319634 | A1 | * | 12/2009 | Tanaka et al. ............ 709/212 |

FOREIGN PATENT DOCUMENTS

JP   2001-331457   11/2001

* cited by examiner

*Primary Examiner* — Hong Kim
(74) *Attorney, Agent, or Firm* — Harness, Dickey & Pierce, P.L.C.

(57) ABSTRACT

A memory mapping unit requests allocation of a remote memory to memory mapping units of other processor nodes via a second communication unit, and requests creation of a mapping connection to a memory-mapping managing unit of a first processor node via the second communication unit. The memory-mapping managing unit creates the mapping connection between a processor node and other processor nodes according to a connection creation request from the memory mapping unit, and then transmits a memory mapping instruction for instructing execution of a memory mapping to the memory mapping unit via a first communication unit of the first processor node.

12 Claims, 32 Drawing Sheets

| SHARED MEMORY ID | STATUS | SHARED MEMORY KEY | REMOTE NODE ID | ADDRESS | REFERENCE COUNT |
|---|---|---|---|---|---|
| 1 | IN USE | 2001 | 50c | 0x3000 0000 | 1 |
| 2 | NOT IN USE | | | | |
| 3 | NOT IN USE | | | | |

| STATUS | ADDRESS | SIZE |
|---|---|---|
| NOT IN USE | 0x3000 0000 | 256 MB |
| | | |
| | | |
| | | |

| STATUS | ADDRESS | SIZE |
|---|---|---|
| IN USE | 0x3000 0000 | 4 MB |
| NOT IN USE | 0x3040 0000 | 252 MB |
| | | |
| | | |

| NODE ID | STATUS | ADDRESS | SIZE | REMOTE NODE ID | REMOTE MEMORY ADDRESS |
|---|---|---|---|---|---|
| 50B | NOT IN USE | 0xE000 0000 | 64 MB | - | - |
| 50C | NOT IN USE | 0xE000 0000 | 64 MB | - | - |
| ... | NOT IN USE | 0xE000 0000 | 64 MB | - | - |
| | | | | | |
| | | | | | |

| NODE ID | STATUS | ADDRESS | SIZE | REMOTE NODE ID | REMOTE MEMORY ADDRESS |
|---|---|---|---|---|---|
| 50B | IN USE | 0xE000 0000 | 4 MB | 50C | 0x3000 0000 |
| 50B | NOT IN USE | 0xE040 0000 | 60 MB | - | - |
| 50C | NOT IN USE | 0xE000 0000 | 64 MB | - | - |
| ... | NOT IN USE | 0xE000 0000 | 64 MB | - | - |
| | | | | | |
| | | | | | |

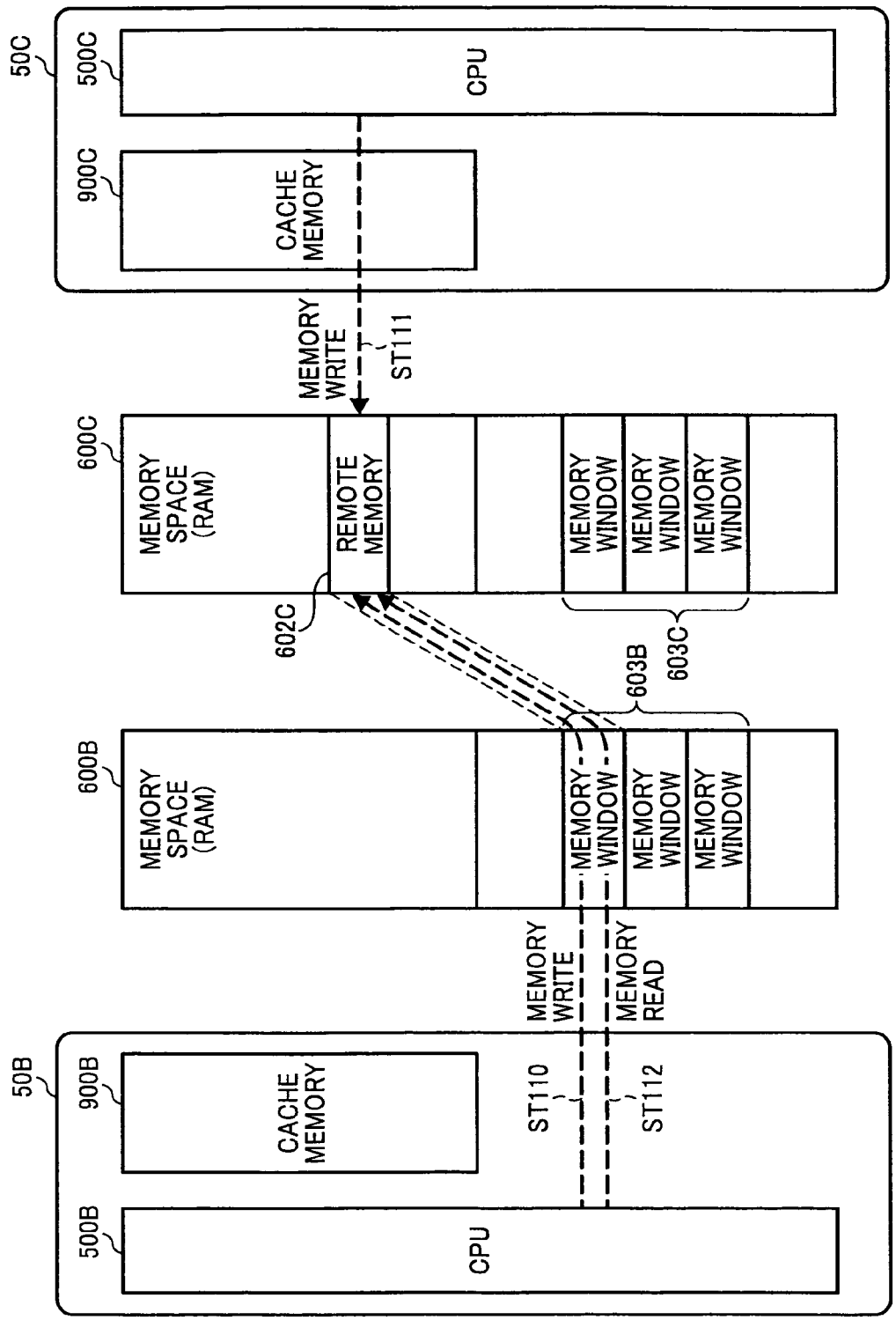

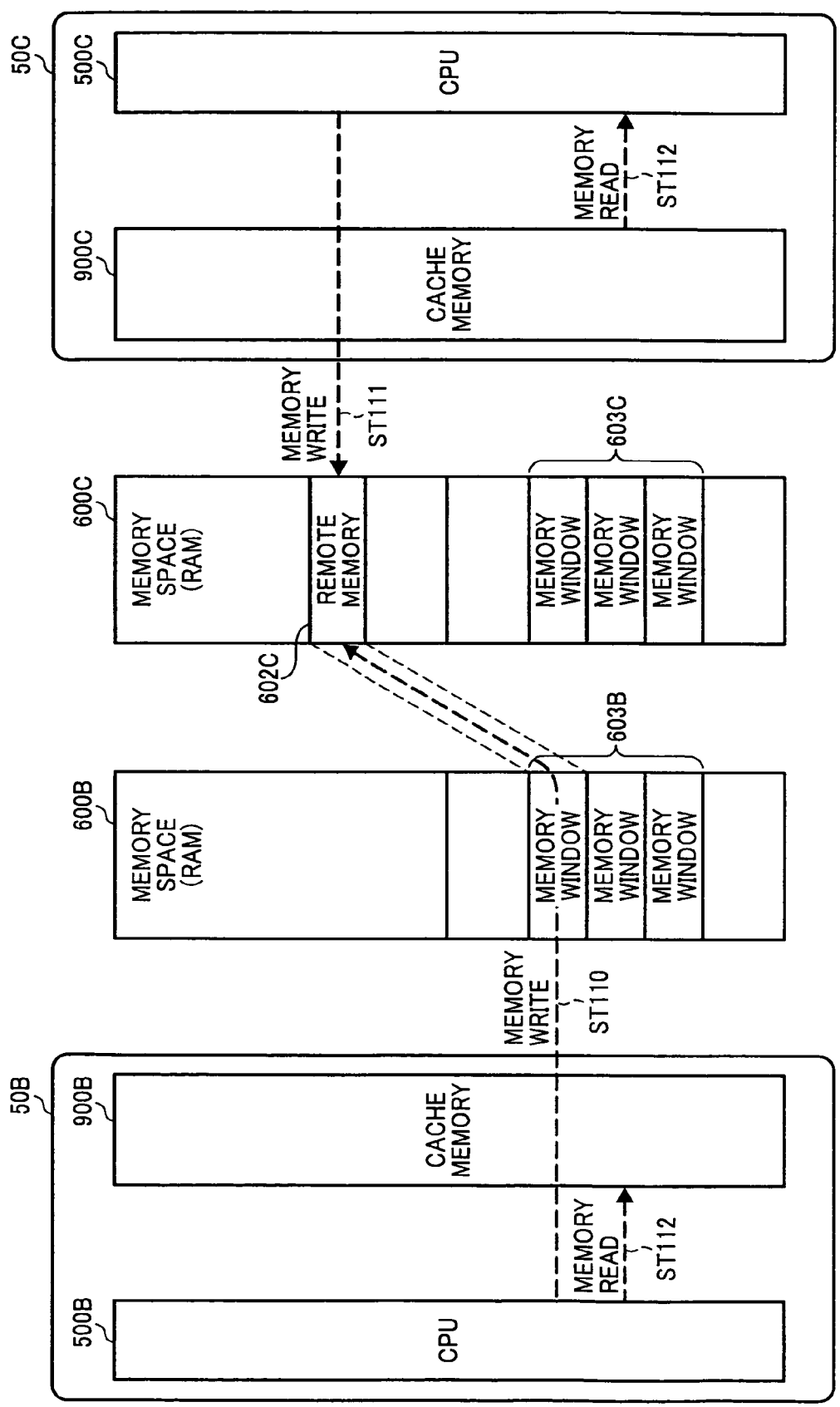

MULTIPROCESSOR SYSTEM FOR MEMORY MAPPING OF PROCESSING NODES

CROSS-REFERENCE TO RELATED APPLICATIONS

The present application claims priority to and incorporates by reference the entire contents of Japanese priority document 2007-240025 filed in Japan on Sep. 14, 2007.

BACKGROUND OF THE INVENTION

1. Field of the Invention

The present invention relates to loosely-coupled multiprocessor systems in which a plurality of processors having memories, in which memory spaces independent from one another are configured, are connected.

2. Description of the Related Art

Conventionally, there is a tightly-coupled multiprocessor system in which a plurality of processors share a main memory. Such a multiprocessor system can be configured at relatively low cost by adopting a processor applicable to a symmetric multi processing configuration (SMP) such as an x86 CPU of Intel Corporation and Advance Micro Devices, Inc. The processor is often adopted in a system that is not only required to be excellent in performance but also required to be reduced in a total cost of ownership (TCO). However, in the tightly-coupled multiprocessor system, a larger load is imposed on the memory as the number of processors increases. Therefore, although the performance of the entire system is improved to some extent according to the increase in the number of processors, even if the number of processors is further increased, the performance of the entire system is not so improved but saturated because of difficulty in accessing the memory. In other words, the tightly-coupled multiprocessor system is suitable for a relatively small-size system but is not adaptable to a large-size multiprocessor system mounted with one-hundred or more processors.

On the other hand, there is a loosely-coupled multiprocessor system in which a plurality of processors include main memories independent from one another (see, for example, Japanese Patent Application Laid-open No. 2001-331457). In such a multiprocessor system, even if the number of processors increases, accesses do not concentrate on the memories and the performance of the entire system is not saturated. Therefore, the loosely-coupled multiprocessor system is adaptable to a large-size multiprocessor system mounted with a large number of processors.

However, in the loosely-coupled multiprocessor system, a communication band and a delay time (latency) among the processors affect the performance of the system. This is because, assuming that there is a task such as a simulation to be executed by the multiprocessor system, even if the task is subdivided and allocated to the respective processors, there are often some relation and dependency among the subdivided tasks. Therefore, it is necessary to exchange information such as a calculation result among the processors. To allow the processors to communicate with one another, interfaces such as Ethernet (a registered trademark), InifiBand (a registered trademark), and Myrinet (a registered trademark) have been used. However, Ethernet has latency during communication. In other words, after a process operating on a processor of a transmission source transmits data, it takes long for a process operating on a processor on a reception side to receive the data. Further, a load of protocol processing such as TCP/IP in performing communication is heavy. If latency is long during communication, for example, when data is frequently exchanged among the processors, a communication overhead increases and the performance of the entire system falls. The heavy load of the protocol processing means that the precious performance of a CPU is wastefully consumed for processing other than a primary object of the CPU (e.g., simulation calculation). InifiBand and Myrinet have an advantage that a processing load on a CPU is light because latency is short and protocol processing is performed by hardware. However, interface cards for using InifiBand and Myrinet are extremely expensive because the interface cards are high in function and performance compared with those for Ethernet. Therefore, InifiBand and Myrinet are not often adopted in multiprocessor systems required to be reduced in cost. In general, a shared memory programming model is used to exchange a large amount of data among the processes in the tightly-coupled multiprocessor system. However, because InifiBand and Myrinet are merely high-speed communication means, it is rather difficult to realize a shared memory function on these interfaces. Therefore, when software developed for the tightly-coupled multiprocessor system is transitioned to the loosely-coupled multiprocessor system, a source code is rewritten. As a result, development efficiency for the software falls.

Therefore, there is a demand for a loosely-coupled multiprocessor system having high scalability of performance in which latency is short and a processing load on a CPU is relatively light. It is also desired to suppress a fall in development efficiency for software as much as possible.

SUMMARY OF THE INVENTION

It is an object of the present invention to at least partially solve the problems in the conventional technology.

According to an aspect of the present invention, there is provided a multiprocessor system including a plurality of processor nodes each including a memory having an independent memory space. The processor nodes are connected via a plurality of communication lines. Each of the processor nodes includes a memory mapping unit that performs a memory mapping for mapping a part or whole of memories of other processor nodes to the memory space in the memory of the processor node as remote memories according to a request from a process operated by an execution of a program, a first communication unit that performs a communication via a first communication line, and a second communication unit that performs a communication via a second communication line. A first processor node, which is one of the processor nodes, further includes a memory-mapping managing unit that creates a mapping connection between a processor node and other processor nodes upon the memory mapping unit performing the memory mapping. The memory mapping unit transmits a memory allocation request for requesting allocation of the remote memories to the memory mapping units of the other processor nodes via the second communication unit, and transmits a connection creation request for requesting creation of the mapping connection to the memory-mapping managing unit of the first processor node via the second communication unit. The memory-mapping managing unit creates the mapping connection between the processor node and the other processor nodes according to the connection creation request transmitted from the memory mapping unit, and then transmits a memory mapping instruction for instructing execution of the memory mapping to the memory mapping unit via the first communication unit of the first processor node.

The above and other objects, features, advantages and technical and industrial significance of this invention will be

BRIEF DESCRIPTION OF THE DRAWINGS

FIG. 44 is a conceptual diagram of an example of an operation for disabling cache memories with respect to the memory windows when the first leaf node has the cache memory and the second leaf node has the cache memory; and FIG. 45 is a conceptual diagram of an example of an operation for activating the cache memories with respect to the memory windows according to the embodiment.

DETAILED DESCRIPTION OF THE PREFERRED EMBODIMENTS

Exemplary embodiments of the present invention are explained in detail below with reference to the accompanying drawings.

Figure 1:
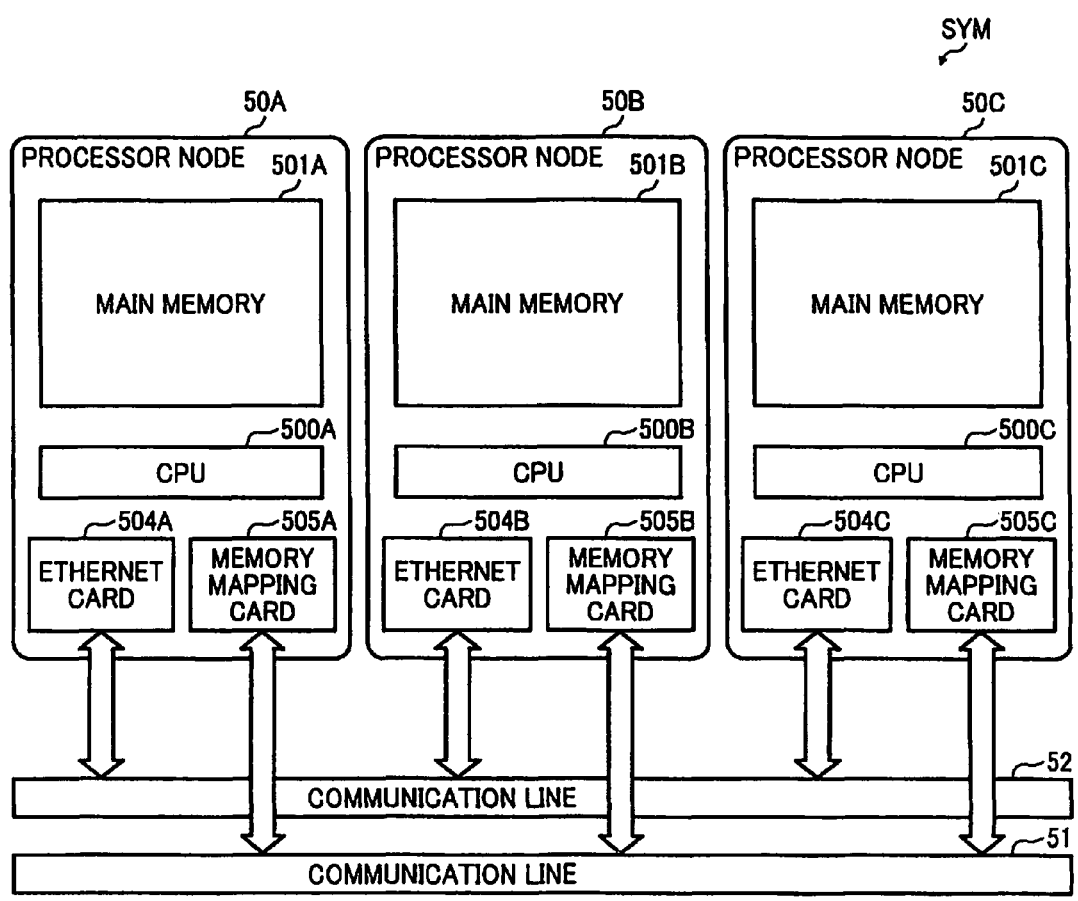
FIG. 1 is a diagram of a configuration of a multiprocessor system of a shared memory type according to an embodiment of the present invention.

FIG. 1 is a diagram of a configuration of a multiprocessor system of a shared memory type according to an embodiment of the present invention. In a multiprocessor system SYM according to the embodiment, for example, three processor nodes 50A to 50C are connected to one another via a communication line 51 and a communication line 52. The processor node 50A includes a pair of a central processing unit (CPU) 500A and a main memory 501A, an Ethernet card 504A, and a memory mapping card 505A. The processor node 50A communicates with the other processor nodes 50B and 50C via the Ethernet card 504A and the communication line 52 or via the Ethernet card 504A and the communication line 51. The processor nodes 50C and 50C have the same configuration and perform communication in the same manner as the processor node 50A. The processor node 50A functions as a root node and the processor nodes 50B and 50C function as leaf nodes. The processor node 50A and the processor nodes 50B and 50C are connected to each other as a server and clients, respectively. The processor node 50A and the processor nodes 50B and 50C are connected peer to peer (P2P).

Figure 2:
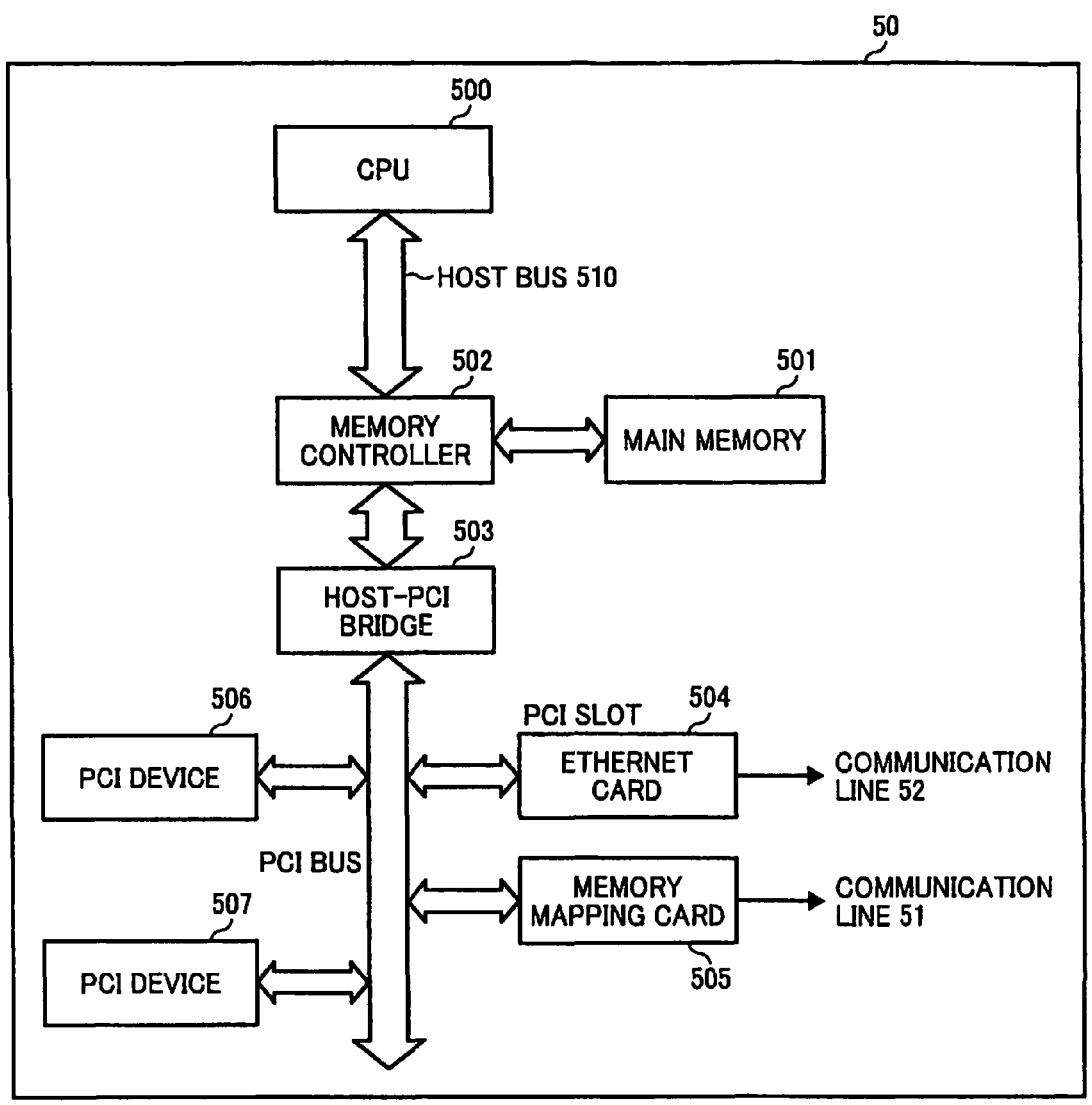
FIG. 2 is a diagram of a specific hardware configuration of processor nodes according to the embodiment.

FIG. 2 is a diagram of a specific hardware configuration of the processor nodes 50A to 50C. When it is unnecessary to distinguish the processor nodes 50A to 50C, the processor nodes are simply referred to as processor nodes 50. Concerning reference numerals and signs affixed to components of the processor nodes 50A to 50C, signs "A" to "C" are not affixed after numerals when it is unnecessary to distinguish the components. The signs are affixed after the numerals only when it is necessary to distinguish the components. The processor node 50 includes a CPU 500, a main memory 501, an Ethernet card 504, a memory mapping card 505, a memory controller 502, a host-PCI bridge 503, and PCI devices 506 and 507. The CPU 500 controls the entire processor node 50 by executing various programs stored in the main memory 501. The CPU 500 has a memory management unit (MMU) (not shown) and causes the MMU to realize a paging function using a page table. The main memory 501 is a storage device that stores various data and various programs and includes a random access memory (RAM). The Ethernet card 504 relays data communication conforming to the standard of Ethernet. The memory mapping card 505 relays data communication to a remote memory to which memory mapping described later is performed.

The memory controller 502 is connected to the CPU 500 via a host bus 510. The memory controller 502 receives a request for reading out data from or writing data in input/output devices such as the main memory 501, the Ethernet card 504, and the memory mapping card 505 from the CPU 500. The memory controller 502 allocates the request to object devices. For example, in a computer mounted with an x86 CPU manufactured by Intel Corporation, a chip set called north bridge or memory controller hub (MCH) mounted on a motherboard as a main board is equivalent to the memory controller 502.

The host-PCI bridge 503 issues an access request from the CPU 500 to the PCI devices 506 and 507 or receives a DMA request from the PCI devices 506 and 507 to the main memory 501 and transfers the DMA request to the memory controller 502. In the computer mounted with the x86 CPU manufactured by Intel Corporation, a chip set called south bridge or I/O controller hub (ICH) is equivalent to the host-PCI bridge 503.

Figure 3:
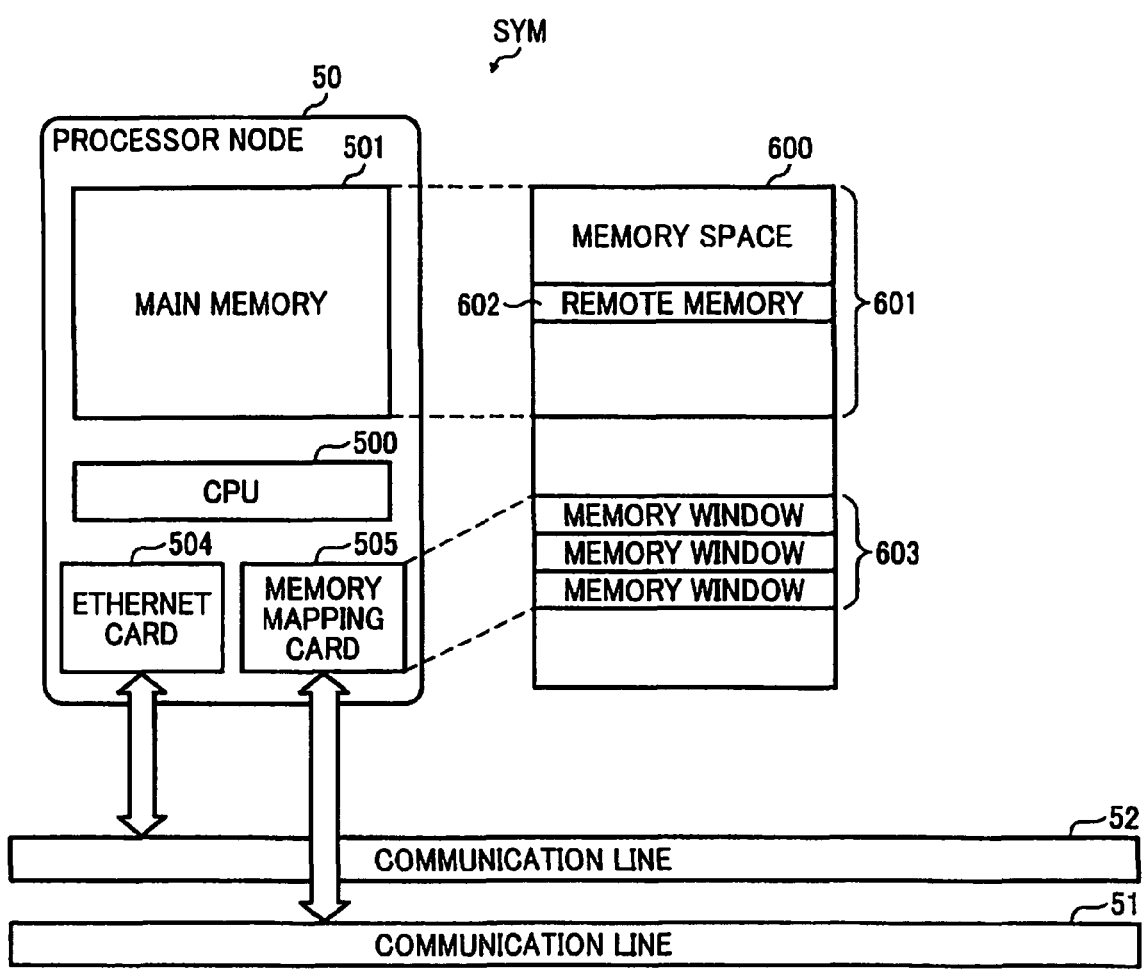
FIG. 3 is a diagram of a correspondence relation between hardware configuring the processor node and a memory space according to the embodiment.

FIG. 3 is a diagram of a correspondence relation between hardware configuring the processor node 50 and a memory space. In the memory space 600, an address of the main memory 501 is mapped to an address space 601 on a low-order side. A remote memory 602 is a part of an area or the entire area of the address space 601 on the low-order side and is a memory area shared by the other processor nodes 50. A memory window 603 is mapped to a part of an area of an address space on a high-order side of the memory space 600. The memory window 603 is a memory area set in the processor node 50 through which the CPU 500 and the PCI devices 506 and 507 of the processor node 50 can perform access to remote memories of the other processor nodes 50 such as data readout and writing because addresses of a part a memory area or the entire memory area of the main memories 501 (hereinafter referred to as remote memories) of the other processor nodes 50 are mapped to the memory window 603. The processor node 50 transmits and receives data concerning the memory mapping via the Ethernet card 504 and transmits and receives data written in the memory window 603 via the memory mapping card 505.

Figures 4, 5, 6, 7:
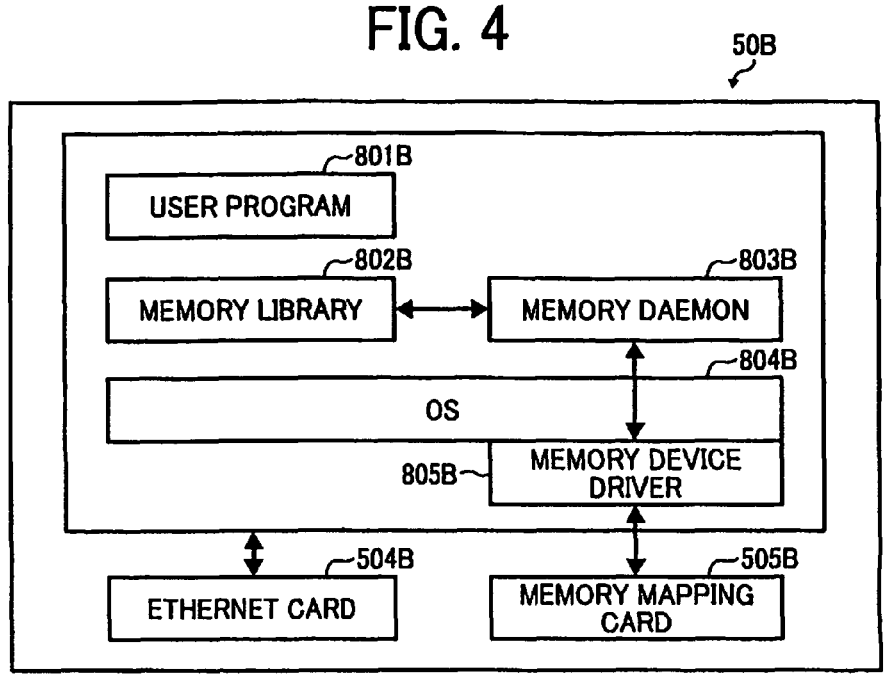
FIG. 4 is a diagram of an example of a software configuration of a first leaf node according to the embodiment.
FIG. 5 is a diagram of an example of a data structure of a shared-memory ID management table according to the embodiment.
FIG. 6 is a diagram of an example of a data structure of a continuous-physical-memory management table according to the embodiment.
FIG. 7 is a diagram of an example of a data structure of the continuous-physical-memory management table according to the embodiment.

For convenience of explanation, the processor node 50A is described as a root node 50A, and the processor nodes 50B and 50C are described as a first leaf node 50B and a second leaf node 50C, respectively. FIG. 4 is a diagram of an example of a software configuration of the first leaf node 50B. The software configuration of the first leaf node 50B includes a user program 801B, a memory library 802B, a memory daemon 803B, an operating system (OS) 804B, and a memory device driver 805B. These are stored in, for example, a main memory 501B and read out from the main memory 501B and executed by the CPU 500B, whereby various functions explained below are realized.

The user program 801B includes various application programs. When the user program 801B is executed by the CPU 500B, various processes operate in the processor node 50B. When a shared memory (a remote memory) is used, the user program 801B designates, to the memory daemon 803B, a shared memory key and a shared memory file for allocating a memory area used as a remote memory. The shared memory key is information for designating a processor node having the remote memory to be used. The shared memory file indicates a port number used by the memory daemon 803B, a path name of a shared-memory ID management table described later, a network interface name, and a correspondence relation between a node ID for specifying a processor node and an IP address.

The OS 804B has, as a function for performing communication between processes, a function for realizing inter-process communication (IPC) such as a socket and a shared memory described later. The OS 804B performs, using the MMU of the CPU 500B, memory management called paging for mapping a physical address of a memory space to a logical address of a virtual memory space in which a process operates in page units (e.g., 4 KB). The OS 804B has a TCP/IP protocol stack.

The memory library 802B conceals an interface of the memory daemon 803B and provides, for example, a user program with an application program interface (API) equivalent to an API for a shared memory function included in a System V IPC generally used as data sharing means between processes in UNIX (registered trademark). The memory library 802B requests the memory daemon 803B to allocate a memory area used as a remote memory. The processor node at a request destination is determined according to the shared memory key and the shared memory file designated by the user program 801B. The memory library 802B requests the memory daemon 803B of the root node (the processor node 50A) to create and delete connection to a memory mapping card 505B. The memory library 802B requests the memory device driver 805B to map an address of a remote memory 602C to a memory space of the main memory 501B.

The memory daemon 803B requests the memory device driver 805B to allocate a memory area used as a remote memory. The memory daemon 803B is responsible for maintaining and controlling the data stored in the shared-memory ID management table. The shared-memory ID management table is information indicating a correspondence relation between the shared memory key and the remote memory. The memory daemon 803B performs memory clear processing for the allocated remote memory.

FIG. 5 is a diagram of an example of a data structure of the shared-memory ID management table. The shared-memory ID management table is stored in, for example, the main memory 501B. In the shared-memory ID management table, a shared memory ID, a status, a shared memory key, a node ID for specifying the processor node having the remote memory (a remote node ID), and an address of the remote memory, and a reference count are stored in association with one another. The shared memory ID is an ID for managing allocation of a memory. The status is data indicating a state of use of the remote memory for which the allocation of a memory is performed. The reference count is data indicating the number of access to the remote memory.

The memory device driver 805B performs, according to invocation of IOCTL, allocation and release processing for a memory area used as the remote memory. The memory device driver 805B performs, according to invocation of a mmap( ) system call, memory mapping of an address of the remote memory 602C to a memory space of the main memory 501B (a local memory) of the first leaf node 50B. The memory device driver 805B performs, according to invocation of the mmap( ) system call, memory mapping to a memory space of a memory window present on a PCI address space. The memory device driver 805B secures a memory area as a memory pool such that physical addresses are continuous in the main memory 501B during the start of the OS 804B. When a part of the secured memory area or the entire memory area is used as the remote memory, the memory device driver 805B control storage of information in a continuous-physical-memory management table for managing the memory area and access to the information.

FIGS. 6 and 7 are diagrams of examples of a data structure of the continuous-physical-memory management table. The continuous-physical-memory management table is stored in, for example, the main memory 501B. In the continuous-physical-memory management table, a status indicating a state of use of a memory area, an address of the memory area, and a memory size of the memory area are stored in association with one another. For example, when a memory area having an address "OX 3000 0000" and a memory size of 4 MB is used as the remote memory, as shown in FIG. 7, the memory device driver 805B stores the status "in use" and the memory size "4 MB" in the continuous-physical-memory management table for the memory area.

A software configuration of the second leaf node 50C is the same as that of the first leaf node 50B. Therefore, illustration and explanation of the software configuration are omitted. However, in the following explanation, in reference numerals and signs of components included in the software configuration of the second leaf node 50C, to distinguish the components from those of the first leaf node 50B, the sign "B" of the reference numerals and signs of the components included in the software configuration of the first leaf node 50B is changed "C".

Figures 8, 9, 10:
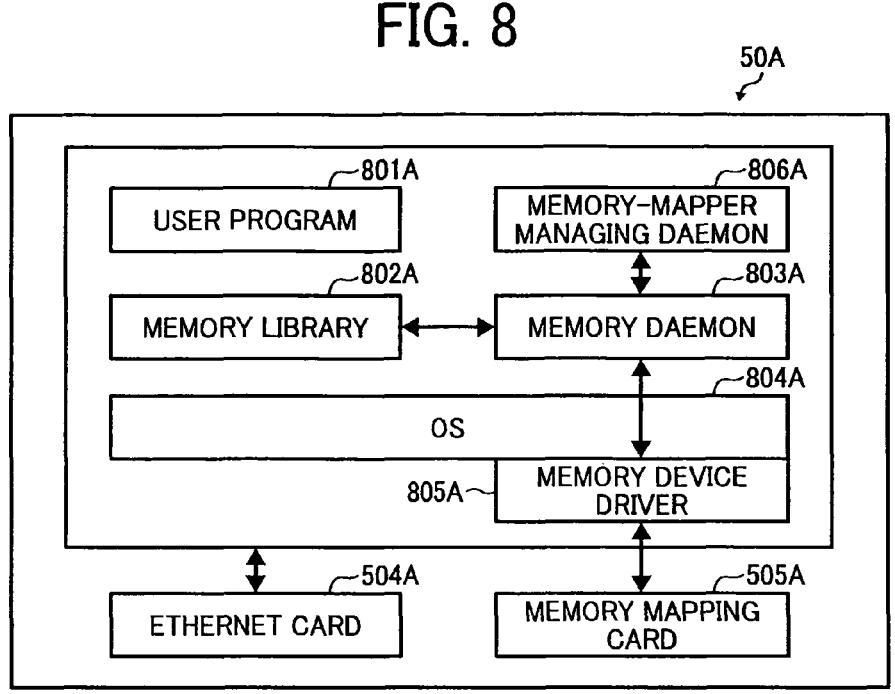
FIG. 8 is a diagram of an example of a software configuration of a root node according to the embodiment.
FIG. 9 is a diagram of an example of a data structure of a memory-window management table according to the embodiment.
FIG. 10 is a diagram of an example of the data structure of the memory-window management table according to the embodiment.

FIG. 8 is a diagram of an example of a software configuration of the root node 50A. Explanation of components same as those in the software configuration of the first leaf node 50B is omitted. The software configuration of the root node 50A includes a memory-mapper managing daemon 806A in addition to a user program 801A, a memory library 802A, a memory daemon 803A, an OS 804A, and a memory device driver 805A. In addition to the functions described above, the memory daemon 803A requests the memory-mapper managing daemon 806A to create and delete connection to the memory mapping card 505A. The memory daemon 803A controls storage of data in and access to a memory-window management table that indicates a correspondence relation between a memory window and a remote memory.

FIGS. 9 and 10 are diagrams of examples of a data structure of the memory-window management table. The memory-widow management table is stored in, for example, the main memory 501A. In the memory-window management table, as shown in FIG. 9, a node ID for specifying the processor node that uses the remote memory, a status indicating a state of use of the memory window, an address of the memory window, and a memory size are stored in advance as information concerning the memory window. When the remote memory is mapped to the memory window, as shown in FIG. 10, a node ID for specifying the processor node having the remote memory (a remote node ID) and an address of the remote memory area stored as information concerning the remote memory in association with the information concerning the memory window. The status stored as the information concerning the memory window indicates "in use".

The memory-mapper managing daemon 806A creates and deletes memory mapping connection. In other words, the root node 50A creates and deletes, according to a function of the memory-mapper managing daemon 806A, memory mapping connection in response to requests from the leaf nodes 50B to 50C.

Figure 11:
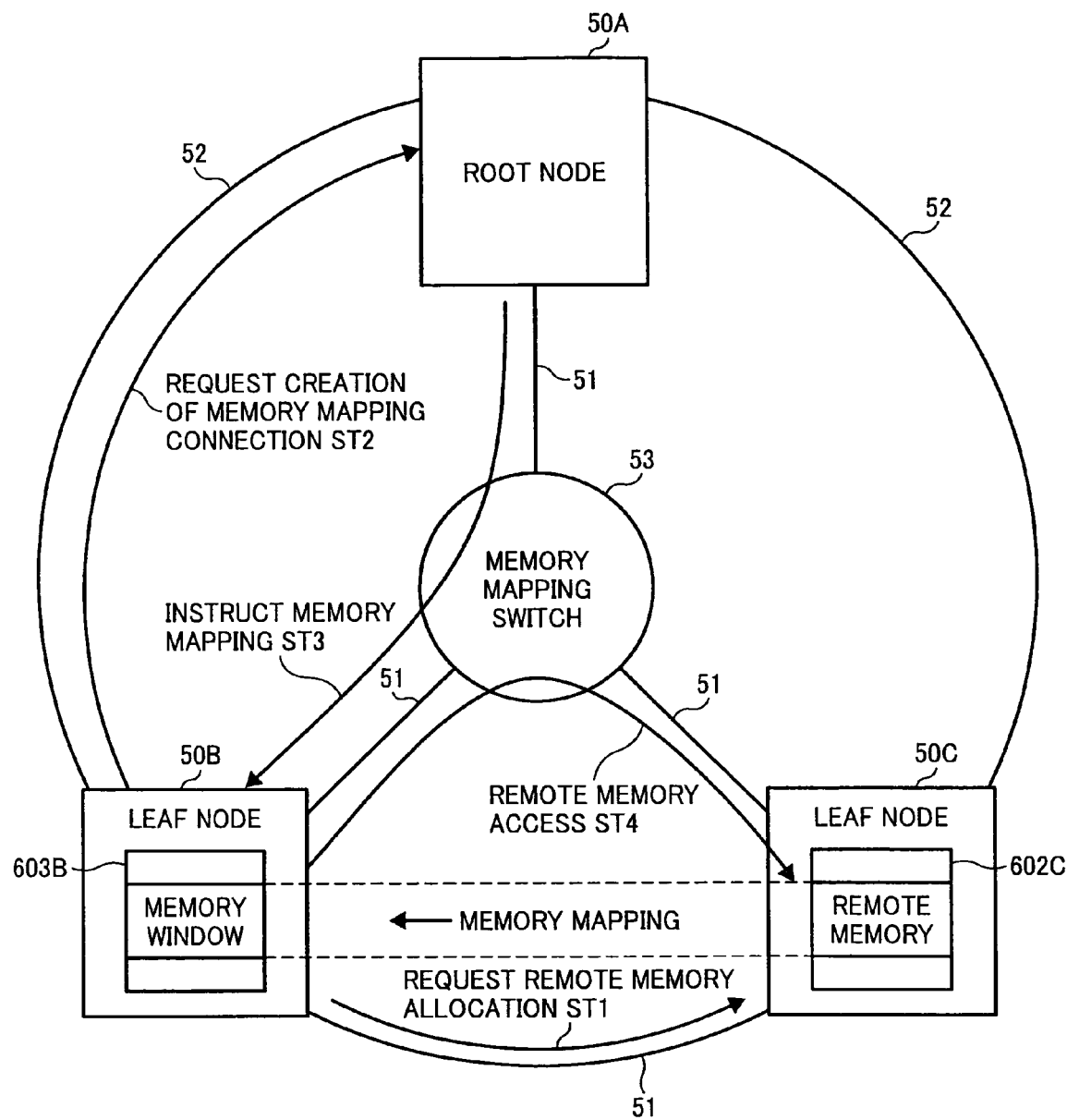
FIG. 11 is a conceptual diagram of a procedure of processing for performing memory mapping and accessing a remote memory in a multiprocessor system according to the embodiment.

FIG. 11 is a conceptual diagram of a procedure of processing for performing memory mapping and accessing a remote memory in the multiprocessor system SYM. Communication between the root node 50A and the leaf nodes 50B and 50C via the communication line 51 is performed via a memory mapping switch 53. When the first leaf node 50B accesses a remote memory of the second leaf node 50C, the first leaf node 50B requests the second leaf node 50C to allocate the remote memory via the communication line 52 (ST1) and requests the root node 50A to create memory mapping connection (ST2). The root node 50A creates, in response to the request, memory mapping connection for mapping the remote memory 602C to a memory window 603B and instructs the first leaf node 50B to perform mapping via the communication line 51 (ST3). The first leaf node 50B performs memory mapping for mapping the remote memory 602C to a memory space of the main memory 501B. As a result, the first leaf node 50B can access the remote memory 602C of the second leaf node 50C via the communication line 51 (ST4).

Figure 12:
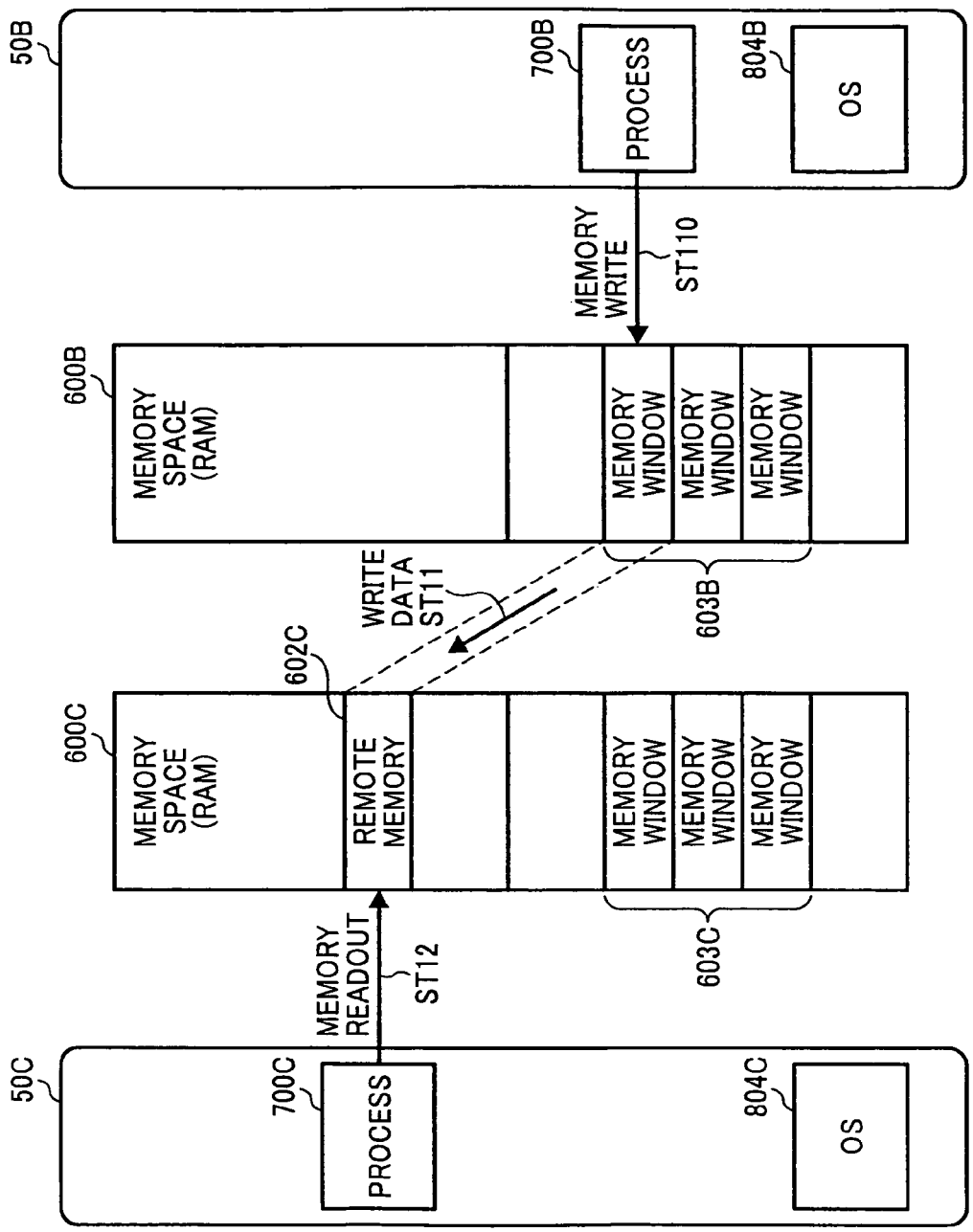
FIG. 12 is a diagram of an example of a state in which the first leaf node accesses a remote memory subjected to mapping according to the embodiment.

FIG. 12 is a diagram of an example of a state in which the first leaf node 50B accesses the remote memory 602C for which mapping is performed as described above. A process 700B operates when the CPU 500B executes the user program 801B of the processor node 50B. A process 700C operates when a CPU 500C executes a user program 801C of the processor node 50C. For example, when the process 700B operating on the processor node 50B writes data in an area of the memory window 603B (ST10), the written data and an address are transmitted to the second leaf node 50C via the memory mapping cards 505B and 505C. The data is written in the remote memory 602C of the second leaf node 50C (ST11). The process 700C operating on the second leaf node 50C reads out the data from the remote memory 602C (ST12). Consequently, the data can be transmitted from the first leaf node 50B to the second leaf node 50C.

Figure 13:
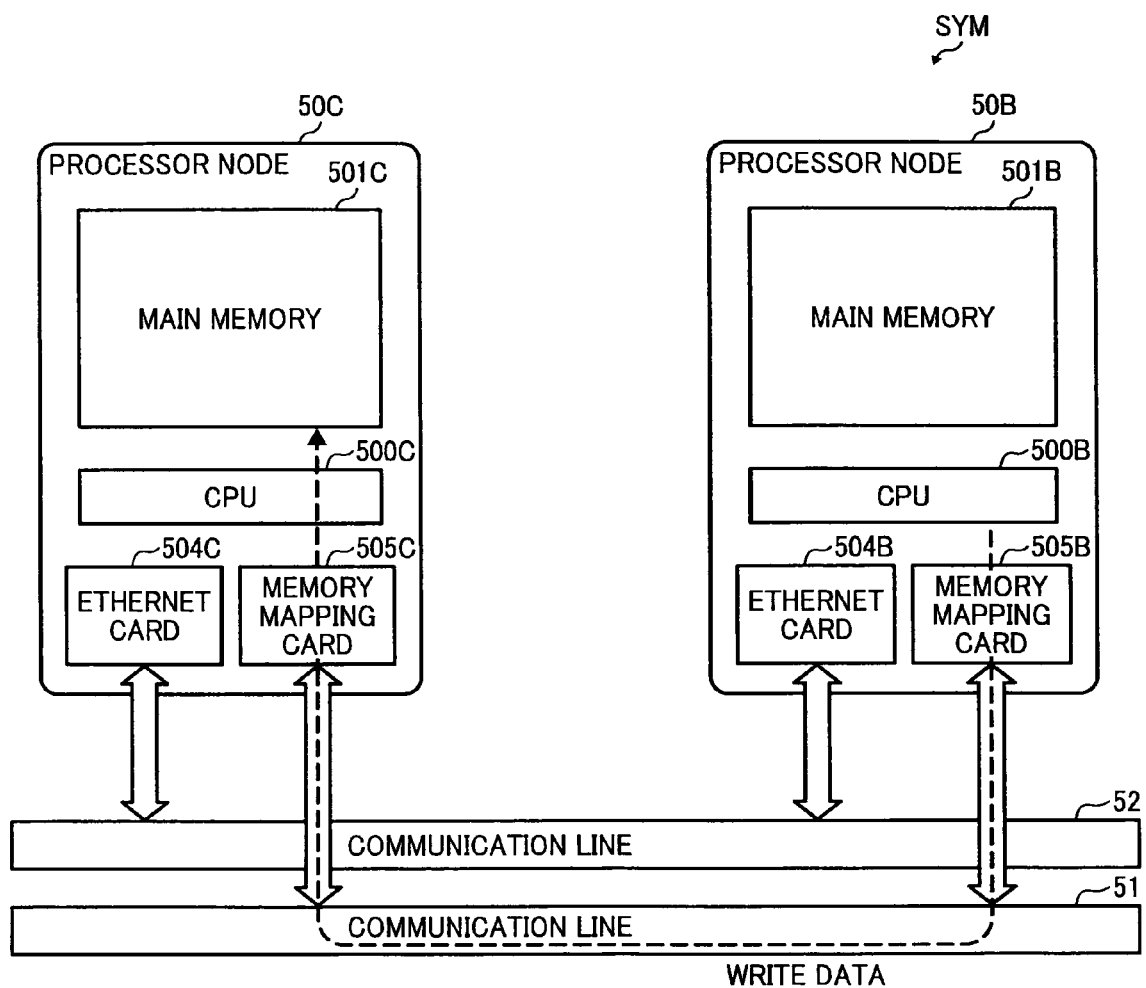
FIG. 13 is a diagram of an example of a dataflow during writing of data in the remote memory of a main memory of a second leaf node by the first leaf node according to the embodiment.

FIG. 13 is a diagram of an example of a dataflow during the writing of data in the remote memory 602C of the main memory 501 of the second leaf node 50C by the first leaf node 50B. As shown in the figure, the data written in the remote memory 602C of the second leaf node 50C by the CPU 500B of the first leaf node 50B and an address for writing the data are received by the CPU 500C via the memory mapping card 505B, the communication line 51, and the memory mapping card 505C and written in the main memory 501C by the CPU 500C.

Figure 14:
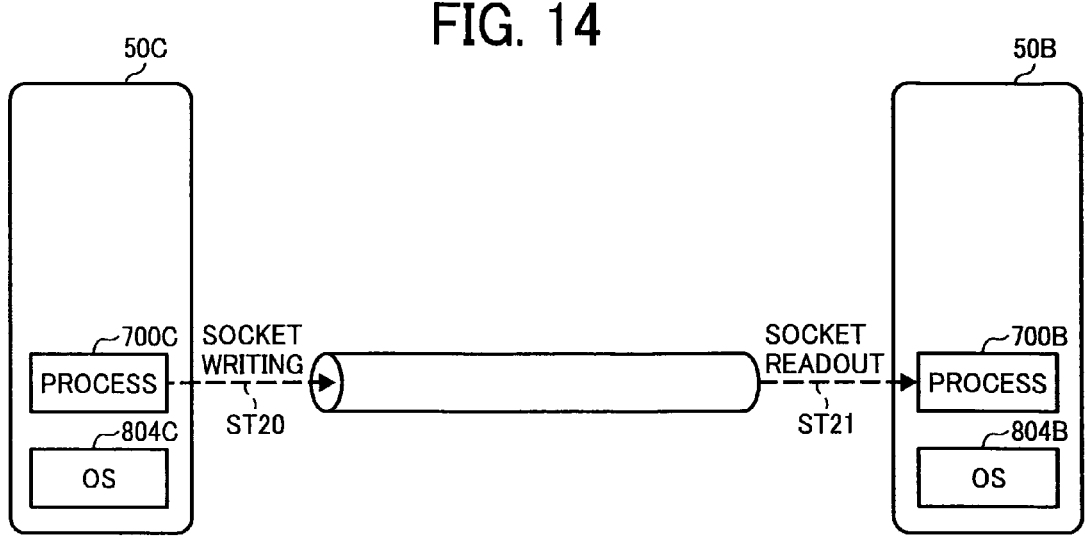
FIG. 14 is a diagram of a state in which processes communicate with each other using sockets between the first leaf node and the second leaf node according to the embodiment.

FIG. 14 is a diagram of a state in which a process performs communication between the leaf nodes 50B and 50C using socket communication. The process 700C operating on the second leaf node 50C performs socket writing (ST20) and the process 700B operating on the first leaf node 50B performs socket readout (ST21), whereby communication is performed. Because a socket is communication means transparent through networks, processes can bi-directionally perform communication between arbitrary processor nodes configuring the multiprocessor system SYM.

Figure 15:
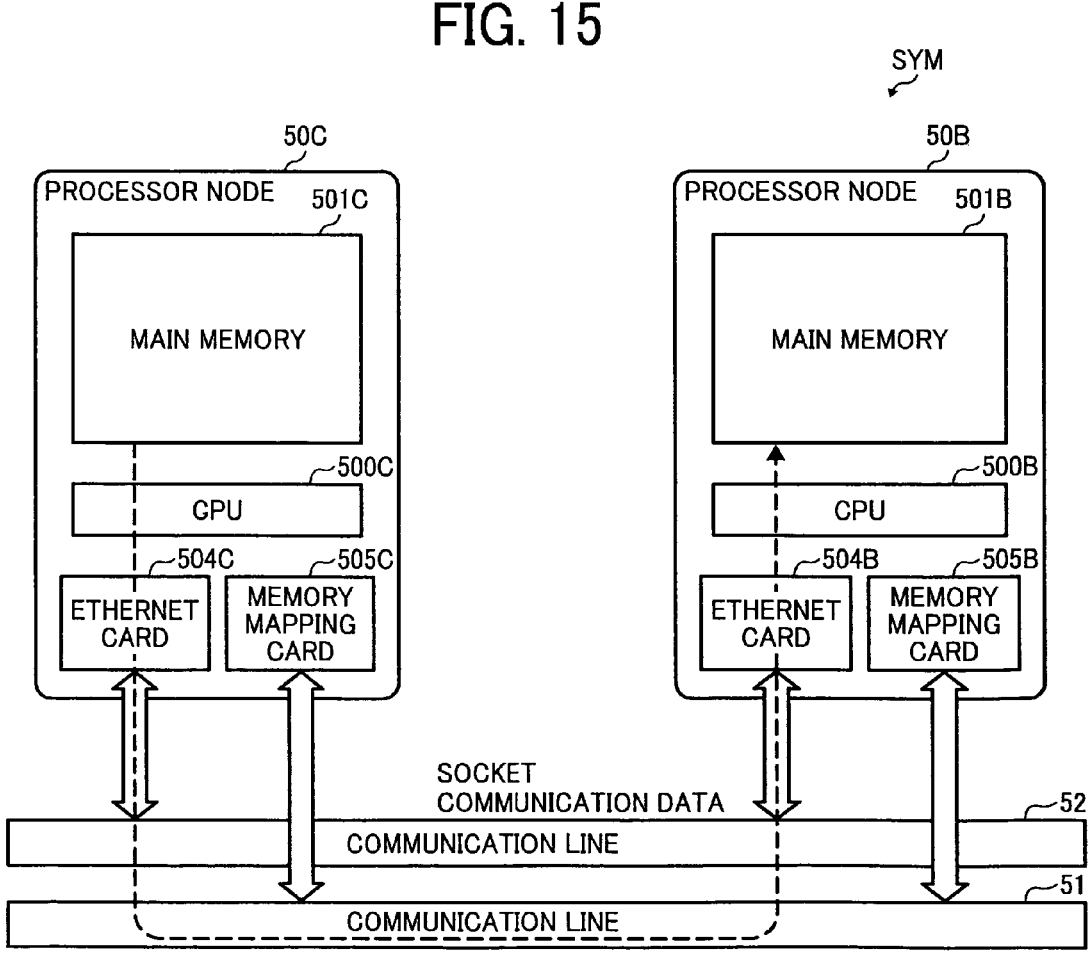
FIG. 15 is a diagram of a dataflow during socket communication according to the embodiment.

FIG. 15 is a diagram of a dataflow during the socket communication. Data flowing through the socket (socket communication data) is divided in frame units by, for example, a TCP/IP protocol stack in the OS 804. In communication through the communication line 51 via the Ethernet card 504, data is transmitted and received in frame units. For example, an Ethernet card 504C on a transmission side reads out frame data written on the main memory 501C and performs transmission processing. An Ethernet card 504B receives the frame, writes the data in the frame in the main memory 501B, and notifies the CPU 500B of the arrival of the frame using interrupt or the like. It is a role of the TCP/IP protocol stack to check correctness of the frame data on the main memory 501 using an error detection mechanism such as check sum and integrate the frame data received in a divided state into the original socket communication data.

An OS such as UNIX (a registered trademark) having a memory protection function between processes cannot perform transmission of data through a global variable or the like between the processes. Therefore, as described above, the OS 804 has a function of realizing inter-process communication (IPC) such as a socket and a shared memory as a function for performing communication between processes. Because the socket is a network-transparent function, there is an advantage that the socket can be used when data is exchanged not only in the processor node but also between processor nodes. On the other hand, there is a disadvantage that the socket is not suitable for exchange of a large amount of data because a software overhead is large. The shared memory has a small overhead and can efficiently perform exchange of a large amount of data (wideband). However, usually, the shared memory can be used only in the processor node. Therefore, a multiprocessor system including a plurality of processor nodes is not often used. As in the example shown in FIG. 12, transmission of data can be performed by sharing the remote memory 602C between the processes 700B and 700C operating on the separate leaf nodes 50B and 50C, respectively. In this way, a distributed shared memory is realized. The distributed shared memory has both the advantage of the socket that can be used between processor nodes and the advantage of the shared memory that is wideband.

Figure 16:
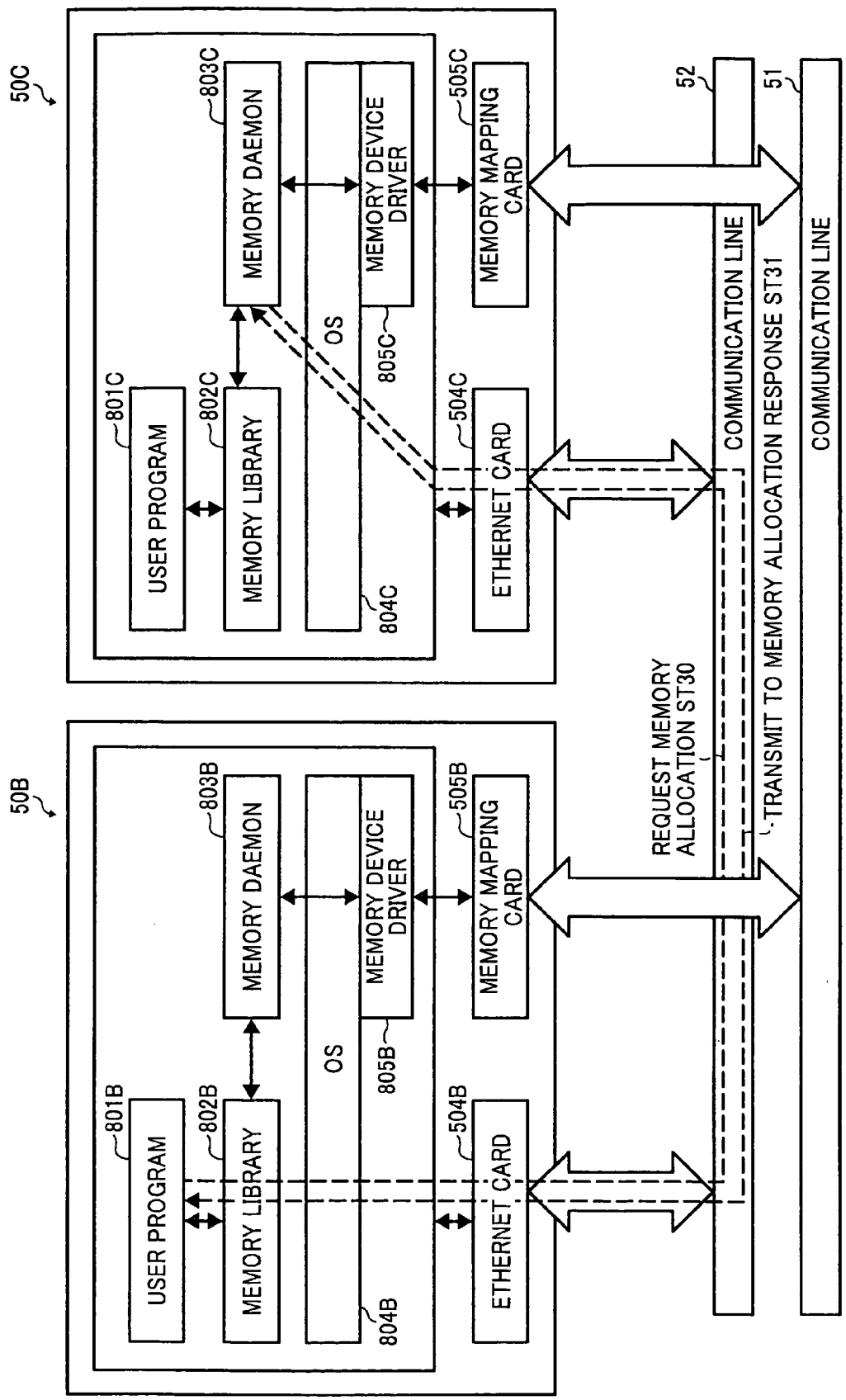
FIG. 16 is a diagram of a state in which the first leaf node requests the second leaf node to perform memory allocation of the remote memory according to the embodiment.

FIG. 16 is a diagram of a state in which the first leaf node 50B requests the second leaf node 50C to allocate a memory area of the remote memory 602C. The user program 801B of the processor node 50B transmits, using the socket communication, a memory allocation request to a memory daemon 803C of the processor node 50C having the remote memory 602C via the Ethernet card 504B, the communication line 52, and the Ethernet card 504 (ST30). The memory daemon 803C secures a part of a memory area or the entire memory area of the main memory 501C as a remote memory and transmits, using the socket communication, a memory allocation response including a physical address of the secured memory area to the user program 801B of the first leaf node 50B (ST31).

Figure 17:
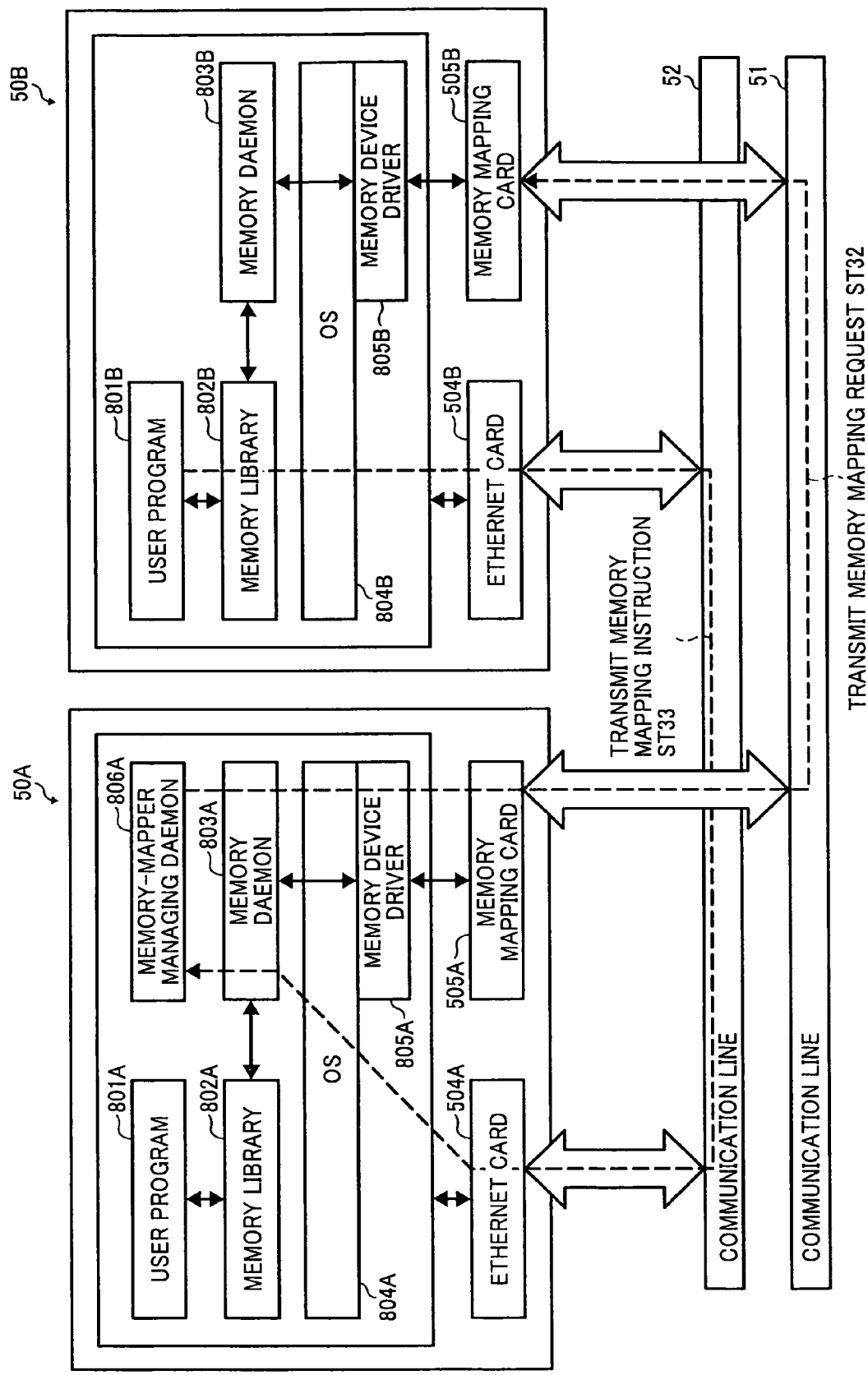
FIG. 17 is a diagram of an example of a state in which the root node requests a memory window to perform memory mapping for the remote memory in response to a request from the first leaf node according to the embodiment.

FIG. 17 is a diagram of an example of a state in which the first leaf node 50B requests the root node 50A to perform memory mapping for the remote memory 602C. The user program 801B of the first leaf node 50B transmits a memory mapping request for requesting to map the remote memory 602C to the memory window 603B to the memory-mapper managing daemon 806A of the root node 50A via the Ethernet card 504B, the communication line 52, and the Ethernet card 504A (ST32). The memory-mapper managing daemon 806A transmits a memory mapping instruction for instructing to map the remote memory 602C to the memory space of the main memory 501 to the memory mapping card 505B of the first leaf node 50B via the memory device driver 805, the memory mapping card 505A, the communication line 51, and the memory mapping card 505B (ST33).

Figure 18:
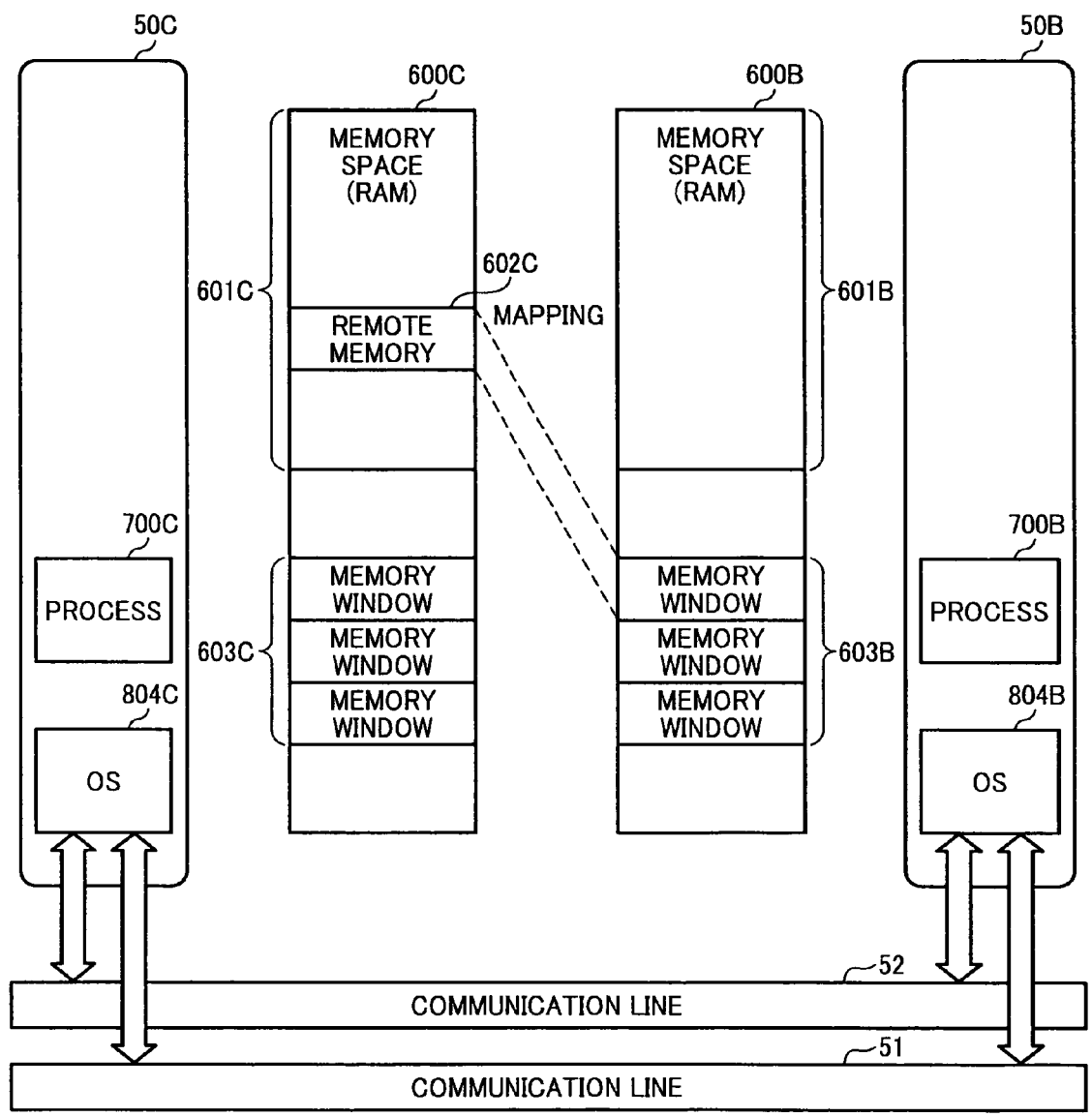
FIG. 18 is a diagram of an example of a state in which the remote memory as a part of a main memory of the second leaf node is mapped to the memory window of the first leaf node according to the embodiment.

For example, as shown in FIG. 18, the remote memory 602C as a part of the main memory 501C of a processor node 51C is mapped to the memory window 603B of the processor node 50B. As a result, the process 700B operating on the processor node 50B can directly access the remote memory 602C as a part of the main memory 501C of the processor node 50C. Even when another leaf node is further connected to the multiprocessor system SYM and a main memory on the other leaf node is used as a remote memory, the relation between the first leaf node 50B and the second leaf node 50C does not change. Memory mapping in the other leaf node is realized by requesting memory mapping from the other leaf node to the root node 50A. Memory mapping can also be performed such that the root node 50A itself has a remote memory.

Figure 19:
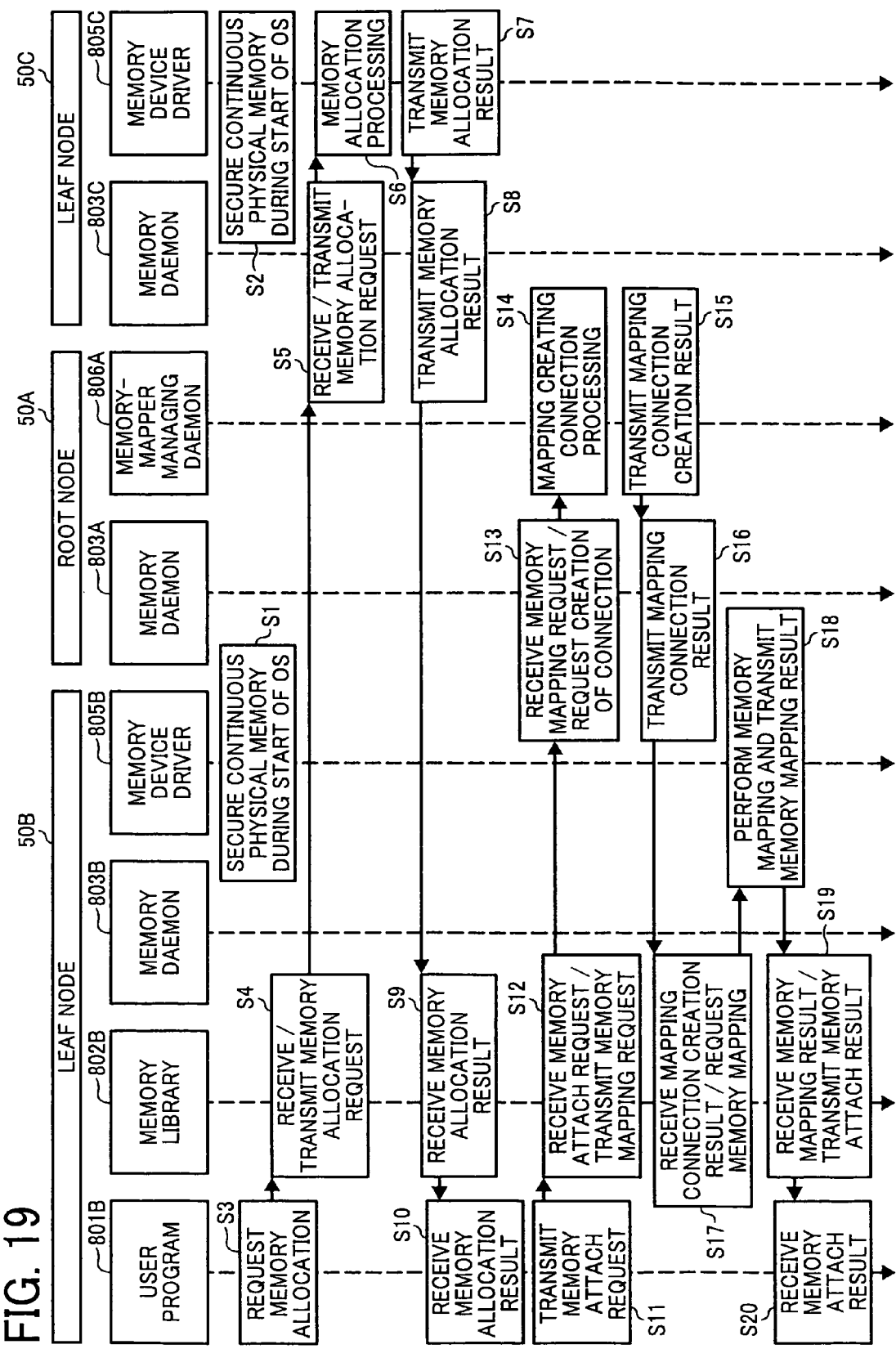
FIG. 19 is a sequence chart of access of the first leaf node to the remote memory of the second leaf node according to the embodiment.

FIG. 19 is a sequence chart of access of the first leaf node 50B to the remote memory 602C of the second leaf node 50C. The memory device driver 805B of the first leaf node 50B secures, during the start of the OS 804B, a memory area for a remote memory of the first leaf node 50B itself as a memory pool such that physical addresses are continuous in the main memory 501B (Step S1). In the same manner, a memory device driver 805C of the second leaf node 50C secures, during the start of an OS 804C, a memory area for the remote memory 602C as a memory pool such that physical addresses are continuous in the main memory 501C (Step S2). The user program 801B of the first leaf node 50B transmits, to request allocation of the remote memory 602C, a memory allocation request including a shared memory key and a memory size of the memory to the memory library 802B (Step S3). At this point, the user program 801B transmits a shared memory file. The memory library 802B receives the memory allocation request. The memory library 802B transmits the memory allocation request including the shared memory key and the memory size to the second leaf node 50C (Step S4).

The memory daemon 803C of the second leaf node 50C receives the memory allocation request. The memory daemon 803C transmits the memory allocation request to the memory device driver 805 (Step S5). The memory device driver 805C allocates a memory area of the requested memory size as the remote memory 602C according to the memory allocation request (Step S6). The memory device driver 805C stores, as shown in FIG. 7, an address and the memory size of the allocated memory area and a status indicating "in use" in the continuous-physical-memory management table. Subsequently, the memory device driver 805C transmits a memory allocation result including the address of the allocated remote memory 602C to the memory daemon 803C (Step S7). The memory daemon 803C transmits the memory allocation result to the first leaf node 50B (Step S8).

The memory library 802B of the first leaf node 50B receives the memory allocation result (Step S9). The memory library 802B numbers the shared memory key with a shared memory ID. The memory library 802B stores the shared memory ID and the shared memory key, the address of the remote memory 602C included in the memory allocation result, and a remote node ID for specifying a processor node (the second leaf node 50C) having the remote memory 602C in the shared-memory ID management table in association with one another. The memory library 802B transmits the memory allocation result including the shared memory ID to the user program 801B (Step S9). The user program 801B receives the memory allocation result including the shared memory ID (Step S10). The user program 801B transmits a memory attach request including the shared memory ID to the memory library 802B as a memory mapping request (Step S11). The memory library 802B transmits the memory mapping request including the remote node ID and the address of the remote memory 602C stored in the shared-memory ID management table in association with the shared memory ID to the root node 50A (Step S12).

The memory daemon 803A of the root node 50A receives the memory mapping request including the remote node ID and the address of the remote memory 602C. The memory daemon 803A transmits a node ID of the processor node that transmits the memory mapping request and the remote node ID and the address of the remote memory 602C included in the memory mapping request to the memory-mapper managing daemon 806A and requests the memory-mapper managing daemon 806A to create mapping connection (Step S13). The memory-mapper managing daemon 806A performs, according to the request, processing for creating mapping connection for mapping the address of the remote memory 602C to the address of the memory window 603B (Step S14). The memory-mapper managing daemon 806A transmits, as a result of the processing, a mapping connection creation result including the address of the remote memory 602C to the memory daemon 803A (Step S15). The memory daemon 803A transmits the mapping connection creation result to the first leaf node 50B (Step S16). According to the mapping connection creation result, the first leaf node 50B is instructed to map the address of the remote memory 602C to the memory space of the main memory 501B. The memory daemon 803A stores, in the memory-window management table, the node ID of the processor node in the request source of the memory mapping (the first leaf node 50B), the address of the memory window 603B as the memory mapping object, the memory size, the remote node ID, the address of the remote memory 602C, and the status indicating "in use" in association with one another.

The memory library 802B of the first leaf node 50B receives the mapping connection creation result as a memory mapping result. The memory library 802B transmits the address of the remote memory 602C to the memory device driver 805B and requests the memory device driver 805B to perform memory mapping (Step S17). The memory device driver 805B performs, according to the request, memory mapping for mapping the address of the remote memory 602C to the memory space of the main memory 501B. The memory space is a virtual memory space generated by a process that operates according to the execution of the user program 801B. The memory device driver 805B transmits a memory mapping result to the memory library 802B (Step S18). The memory library 802B transmits the memory mapping result to the user program 801B as a memory attach result (Step S19). The user program 801B receives the memory attach result (Step S20). The user program 801B can access the remote memory 602C via the memory mapping card 505B and the communication line 51.

Procedures of processing performed by the memory library 802B, the memory daemons 803A and 803C, and the memory device drivers 805B and 805C in the processing shown in FIG. 19 are explained in detail.

Figure 20:
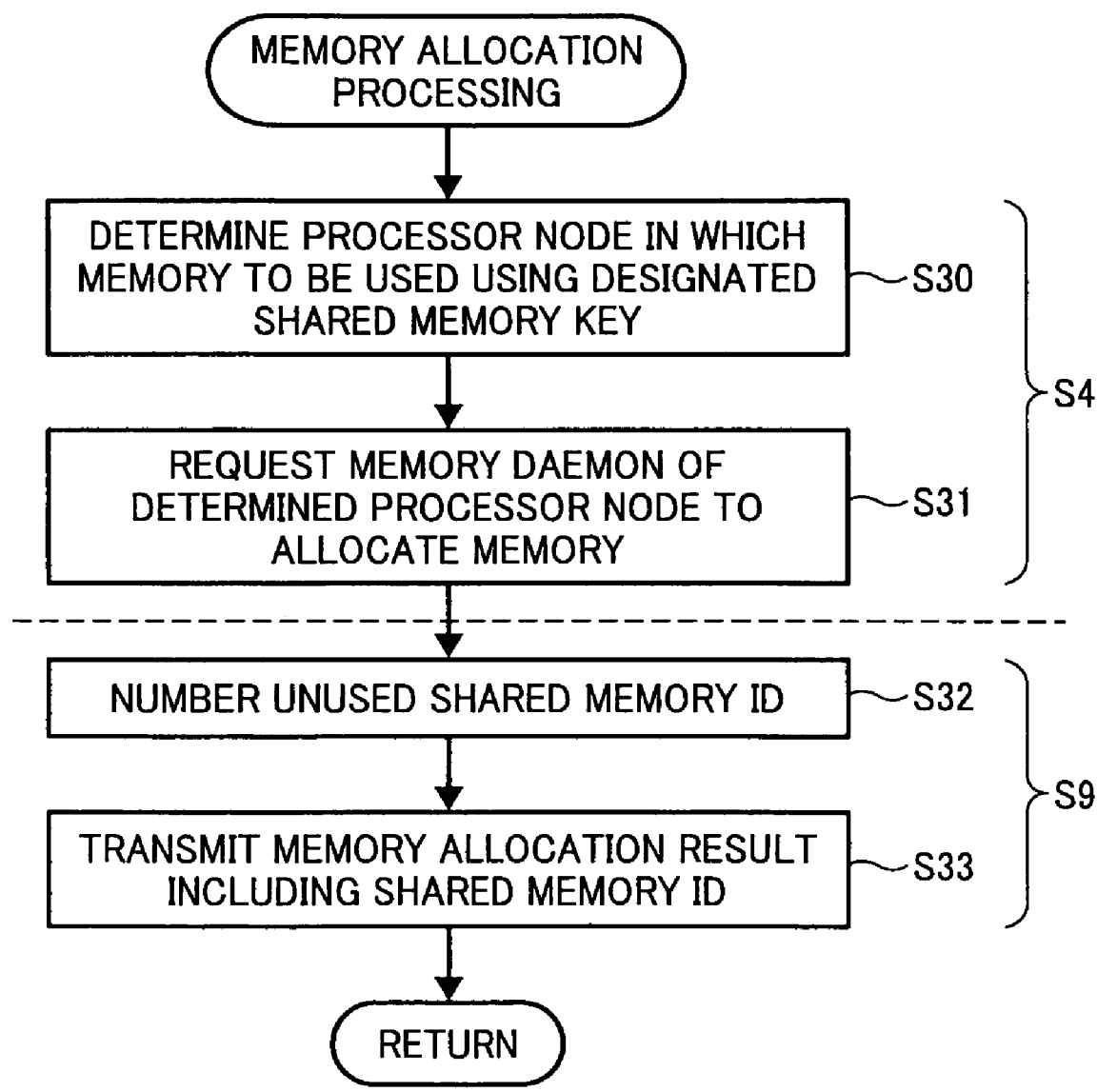
FIG. 20 is a flowchart of a detailed procedure of processing performed at Steps S4 and S9 by a memory library of the first leaf node according to the embodiment.

FIG. 20 is a flowchart of a detailed procedure of processing performed at Step S4 and S9 by the memory library 802B of the first leaf node 50B. At Step S4, the memory library 802B receives the memory allocation request including the shared memory key and the memory size and the shared memory file from the user program 801B. The memory library 802B determines the processor node having the remote memory 602C to be used (the second leaf node 50C) using the shared memory key and the shared memory file (Step S30). The memory library 802B transmits the memory allocation request including the shared memory and the memory size to the memory daemon 803C of the second leaf node 50C (Step S31).

At Step S9, the memory library 802B receives the memory allocation result including the address of the remote memory 602C from the second leaf node 50C. The memory library 802B numbers the shared memory key with an unused shared memory ID and stores the shared memory ID and the address of the remote memory in the shared-memory ID management table in association with each other (Step S32). The memory library 802B transmits the memory allocation result including the shared memory ID to the user program 801B (Step S33).

Figure 21:
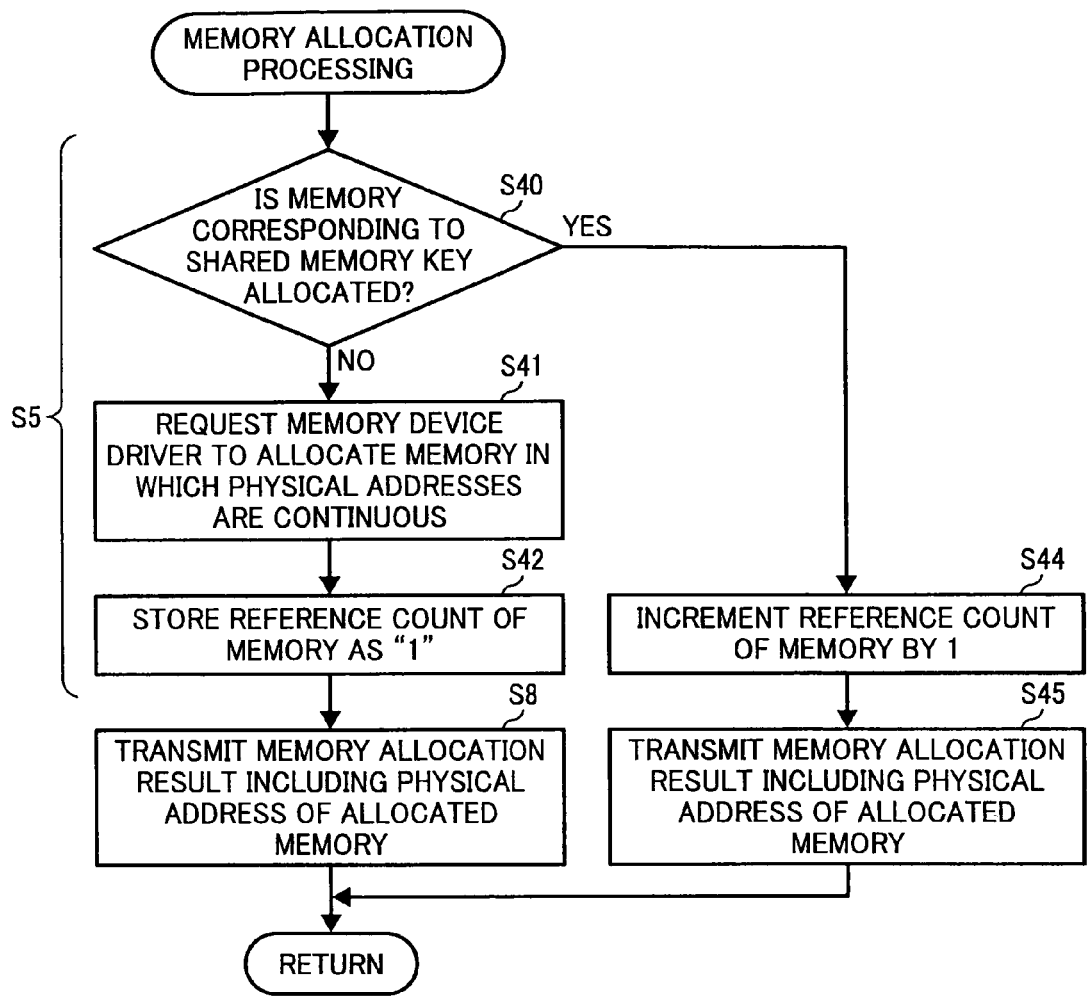
FIG. 21 is a flowchart of a detailed procedure of processing performed at Steps S5 and S8 by a memory daemon of the second leaf node according to the embodiment.

FIG. 21 is a flowchart of a detailed procedure of processing performed at Steps S5 and S8 by the memory daemon 803C of the second leaf node 50C. At Step S5, the memory daemon 803C receives the memory allocation request including the shared memory key and the memory size from the processor node 50B. The memory daemon 803C judges whether a statues is stored in the shared-memory ID management table as "in use" concerning the shared memory ID (Step S40). The judgment result described above is obtained by assuming that memory allocation is requested and the shared memory ID is not stored yet. In this case, the memory daemon 803C requests the memory device driver 805C to allocate a memory area of the memory size included in the memory allocation request, which is a memory area in which physical addresses are continuous, as the remote memory 602C (Step S41). The memory daemon 803C stores a memory reference count corresponding to the shared memory ID in the shared-memory ID management table as "1" (Step S42).

At Step S8, the memory daemon 803C receives a physical address of the memory area allocated according to the request at Step S41 from the memory device driver 805C. The memory daemon 803C transmits the memory allocation result including the physical address to the first leaf node 50B.

When a result of the judgment at Step S40 is affirmative, access to the remote memory 602C is requested. In this case, the memory daemon 803C increments the memory reference count stored in the shared-memory ID management table in association with the shared memory ID by "1" (Step S44). The memory daemon 803C transmits the memory allocation result including the physical address associated with the shared memory ID in the shared-memory ID management table to the first leaf node 50B (Step S45).

Figure 22:
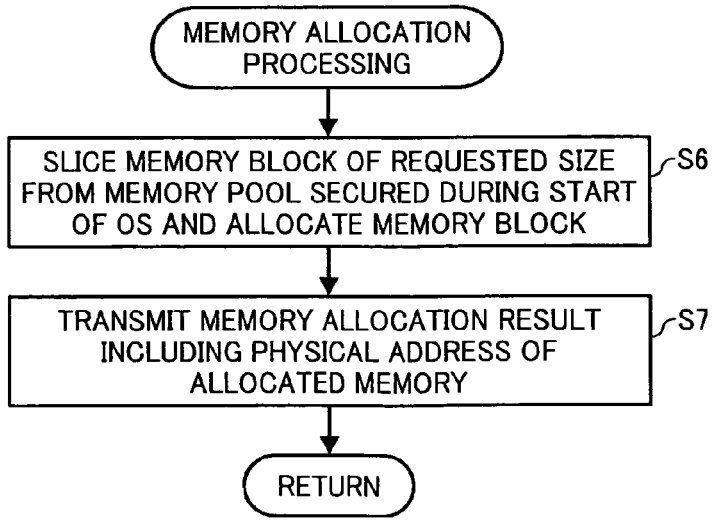
FIG. 22 is a flowchart of a detailed procedure of processing performed at Steps S6 and S7 by a memory device driver of the second leaf node according to the embodiment.

FIG. 22 is a flowchart of a detailed procedure of processing performed at Steps S6 and S7 by the memory device driver 805C of the second leaf node 50C. At Step S7, the memory device driver 805C is requested by the memory daemon 803C to allocate a memory area of the size included in the memory allocation request, which is a memory area in which physical addresses are continuous, as the remote memory 602C. The memory device driver 805C slices a memory block of the memory size from the memory pool secured at Step S2 and allocates the memory block as the requested memory area. At Step S7, the memory device driver 805C transmits a memory allocation result including a physical address of the allocated memory area to the memory daemon 803C.

Figure 23:
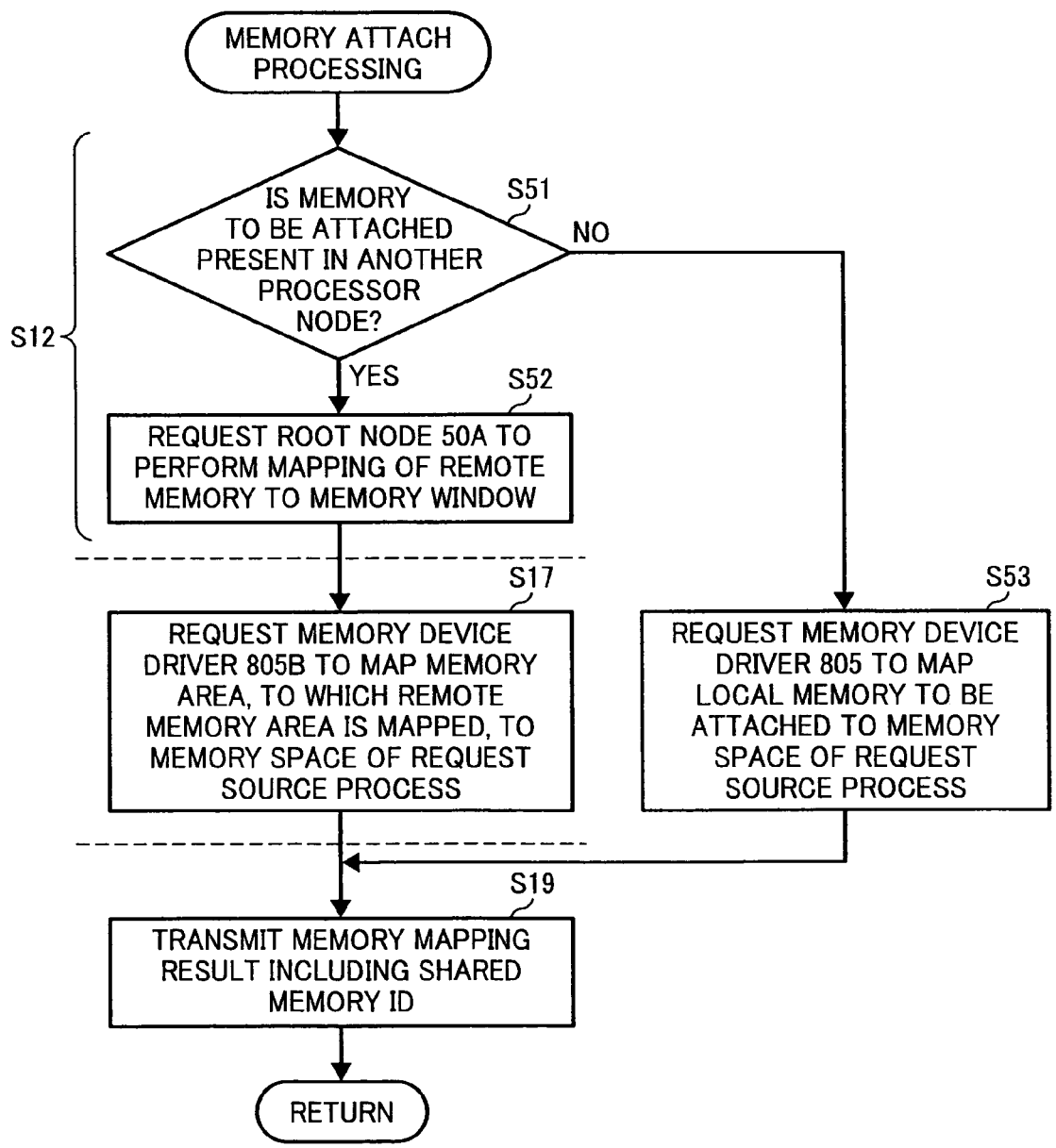
FIG. 23 is a flowchart of a detailed procedure of processing performed at Steps S12, S17, and S19 by the memory library of the first leaf node according to the embodiment.

FIG. 23 is a flowchart of a detailed procedure of processing performed at Steps S12, S17, and S19 by the memory library 802B of the first leaf node 50B. At Step S12, the memory attach request including the shared memory ID is transmitted to the memory library 802B from the user program 801B. The memory library 802B judges whether a memory to be attached is a memory of another processor node, i.e., a status is stored in the shared-memory management table as "in use" concerning the shared memory ID (Step S51). When a result of the judgment is affirmative, the memory library 802B transmits a memory mapping request for requesting mapping of the physical address of the remote memory 602C stored in the shared-memory management table in association with the shared memory ID to the memory window 603B to the root node 50A (Step S52).

At Step S17, the memory library 802B receives the memory mapping result from the root node 50A. The memory library 802B requests the memory device driver 805B to map the address of the memory area, to which the remote memory 602C is mapped, to the memory space of the main memory 501B.

Thereafter, at Step S19, the memory library 802B receives the memory mapping result including the address mapped to the memory space from the memory device driver 805B that performs memory mapping according to the memory mapping request. The memory library 802B transmits the memory mapping result including the address to the user program 801B. The memory library 802B can transmit a memory mapping result including the shared memory ID instead of the address to the user program 801B.

When the judgment result at Step S51 is negative, the memory to be attached is a local memory. In other words, the memory is a remote memory allocated to the main memory 501B of the first leaf node 50B. In this case, the memory library 802B requests the memory device driver 805B to map the address of the memory area of the main memory 501B to the memory space of the main memory 501B (Step S53).

Figure 24:
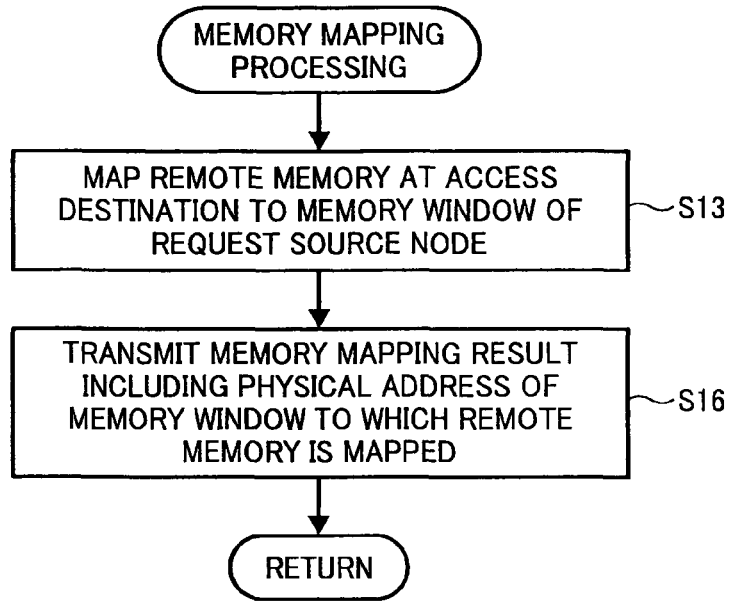
FIG. 24 is a flowchart of a detailed procedure of processing performed at Steps S13 and S16 by a memory daemon of the root node according to the embodiment.

FIG. 24 is a flowchart of a detailed procedure of processing performed at Steps S13 and S16 by the memory daemon 803A of the loot node 50A. At Step S13, the memory daemon 803A receives a memory mapping request for requesting mapping of the physical address of the remote memory 602C to the memory window 603B from the first leaf node 50B. The memory daemon 803A maps, according to the request, the physical address of the remote memory 602C of the second leaf node 50C at a request destination to the memory window 603B of the first leaf node 50B at a request source. The memory daemon 803A stores a correspondence relation between the address of the memory window 603B and the address of the remote memory 602C in the memory-window management table. The memory daemon 803A requests the memory-mapper managing daemon 806A to create mapping connection.

At Step S16, the memory daemon 803A receives a mapping connection creation result from the memory-mapper managing daemon 806A that performs the processing for creating mapping connection according to the request. The memory daemon 803A transmits a memory mapping result including the physical address of the memory window 603B, to which the remote memory 602C is mapped, to the first leaf node 50B.

Figure 25:
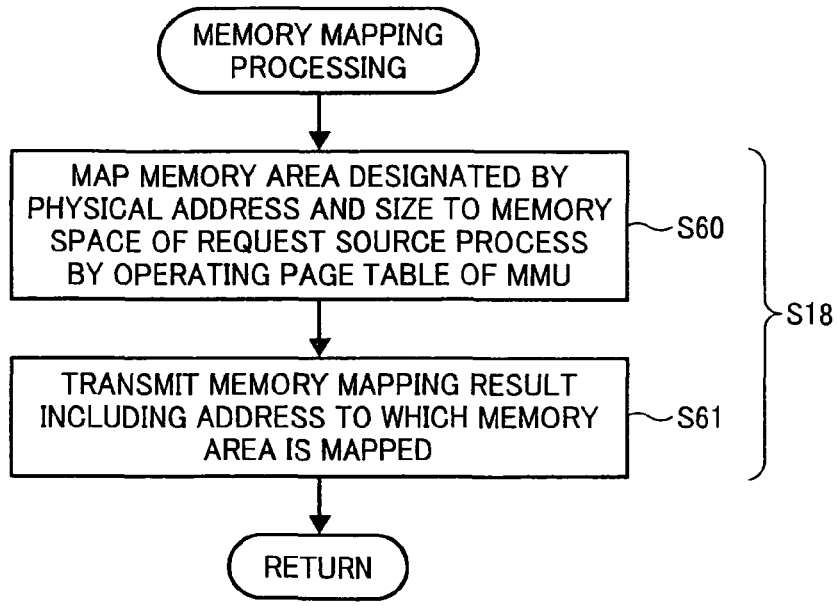
FIG. 25 is a flowchart of a detailed procedure of processing performed at Step S18 by a memory device driver of the first leaf node according to the embodiment.
Figure 26:
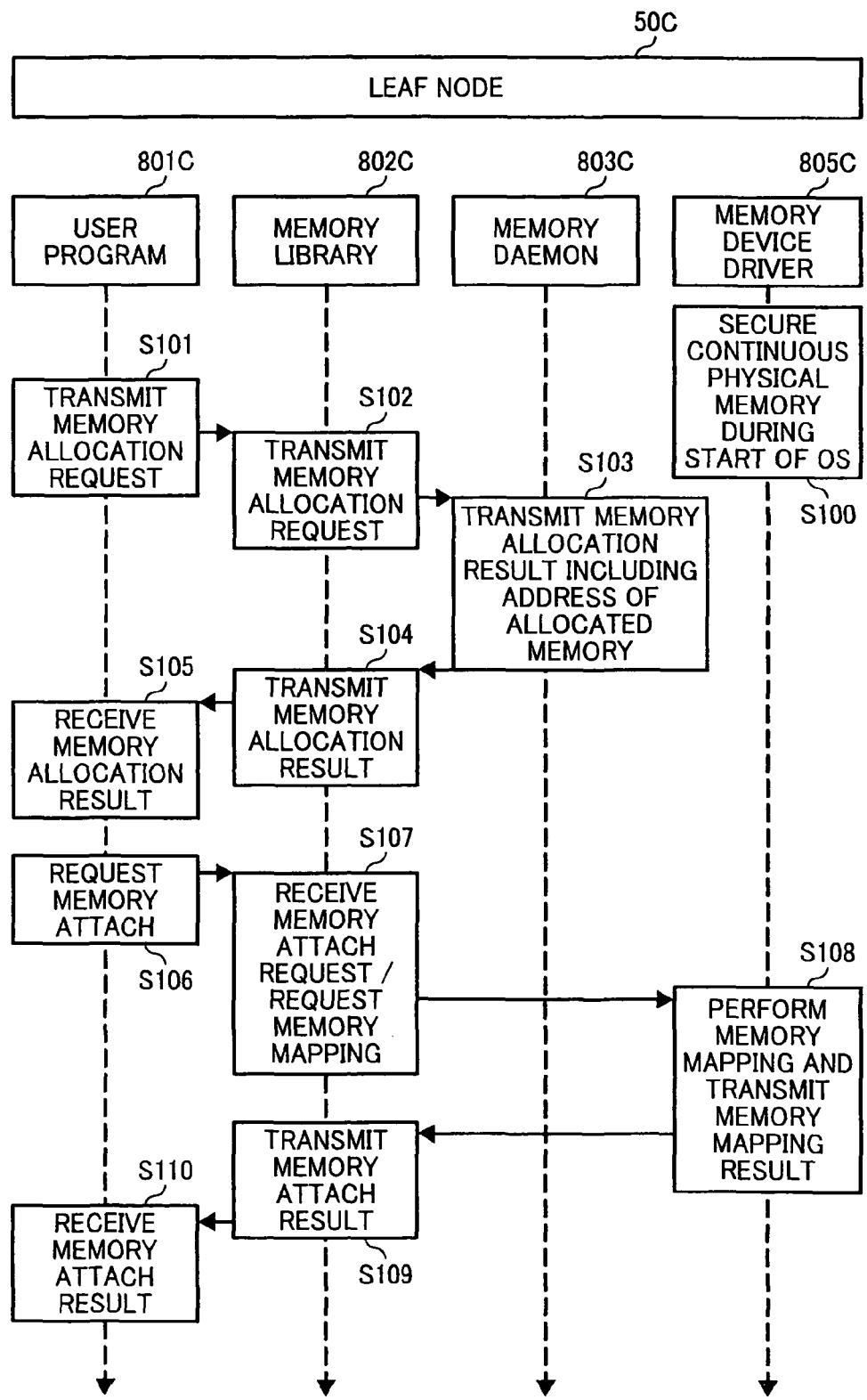
FIG. 26 is a flowchart of a procedure of processing performed by the second leaf node to access the remote memory of the second leaf node according to the embodiment.

FIG. 25 is a flowchart of a detailed procedure of processing performed at Step S18 by the memory device driver 805B of the first leaf node 50B. The memory device driver 805B is requested by the memory daemon 803B to map the address of the memory area, to which the remote memory 602C is mapped, to a memory space. The memory device driver 805B maps, according to the request, a memory area designated by the physical address and the memory size to a memory space of the process (Step S60). This mapping is performed by operating, for example, a page table of the MMU of the CPU 500B. The memory device driver 805B transmits a memory mapping result including the address, to which the memory area is mapped, to the memory library 802B (Step S61).

Procedure of processing performed by the second leaf node 50C to access the remote memory 602C of the second leaf node 50C is explained. In this processing, the remote memory 602C functions as a local memory. Explanation of steps same as those in the procedure of the processing described above may be omitted. The memory device driver 805C secures a memory area in which physical addresses are continuous in the main memory 501C as a memory pool (Step S100). The user program 801C transmits a memory allocation request including a shared memory key and a memory size to a memory library 802C (Step S101). The memory library 802C transmits the memory allocation request to the memory daemon 803C (Step S102). The memory daemon 803C acquires an address stored in the shared-memory ID management table in association with the shared memory key and transmits a memory allocation result including the address to the memory library 802C (Step S103). The memory library 802C receives the memory allocation result and transmits a memory allocation result including a shared memory ID, which is stored in the shared-memory ID management table in association with the address included in the memory allocation result, to the user program 801C (Step S104). The user program 801C receives the memory allocation result (Step S105). The user program 801C transmits the shared memory ID included in the memory allocation result to the memory library 802C and requests the memory library 802C to attach a memory (Step S106). The memory library 802C transmits, according to the request, the address stored in the shared-memory ID management table in association with the shared memory ID to the memory device driver 805C and requests the memory device driver 805C to perform memory mapping (Step S107). The memory device driver 805C performs, according to the request, memory mapping for mapping a memory area of the address to the memory space of the main memory 501C and transmits a mapping result including the mapped address to the memory library 802C (Step S108). The memory library 802C transmits a memory attach result including the address included in the memory mapping result to the user program 801C (Step S109). The user program 801C receives the memory attach result (Step S110).

Figure 27:
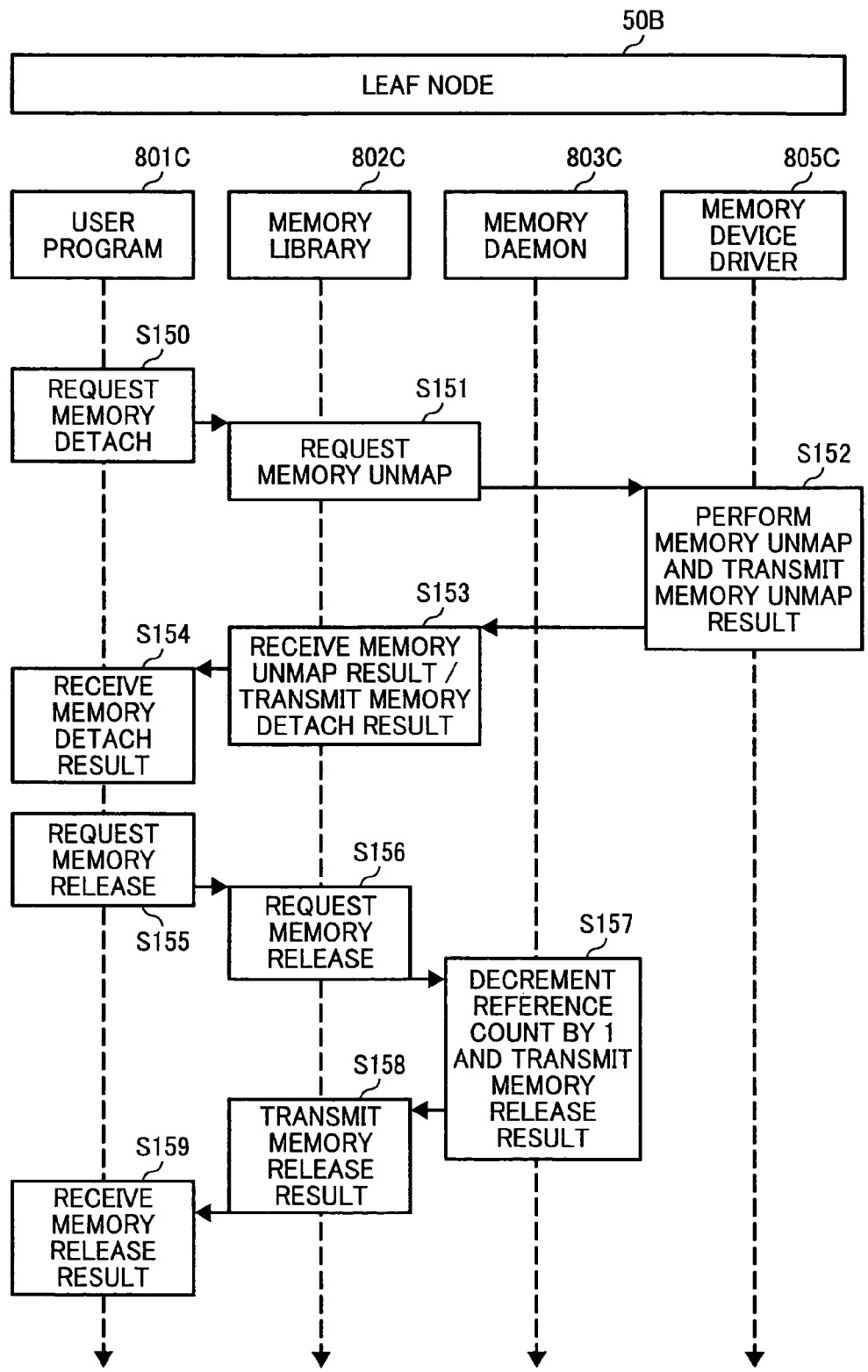
FIG. 27 is a flowchart of a procedure of processing performed by the second leaf node to finish the use of the remote memory allocated to the main memory of the second leaf node according to the embodiment.

A procedure of processing performed by the second leaf node 50C to finish the use of the remote memory 602C allocated to the main memory 501C of the second leaf node 50C is explained with reference to FIG. 27. In this processing, the remote memory 602C functions as a local memory. Explanation of steps same as those in the procedure of the processing described above may be omitted. The user program 801C of the second leaf node 50C requests the memory library 802C to detach a memory including a shared memory key (Step S150). The memory library 802C requests the memory device driver 805C to unmap the memory (Step S151). A remote memory of an address stored in the shared-memory ID management table in association with a shared memory ID corresponding to the shared memory key as described above is a memory to be detached and unmapped. The memory device driver 805C performs memory unmap and transmits a memory unmap result indicating a result of the memory unmap to the memory library 802C (Step S152). The memory library 802C receives the memory unmap result and transmits a memory detach result including the shared memory ID to the user program 801C (Step S153). The user program 801C receives the memory detach result (Step S154). The user program 801C transmits the shared memory ID to the memory library 802C and requests the memory library 802C to release the memory (Step S155). The memory library 802C requests the memory daemon 803C to release the memory (Step S156). The memory daemon 803C decrements, according to the request, a reference count stored in the shared-memory ID management table in association with the shared memory ID by "1". The memory daemon 803C transmits a memory release result to the memory library 802C (Step S157). The memory library 802C transmits the memory release result to the user program 801C (Step S158). The user program 801C receives the memory release result (Step S159). As a result, the use of the remote memory 602C is finished.

Figure 28:
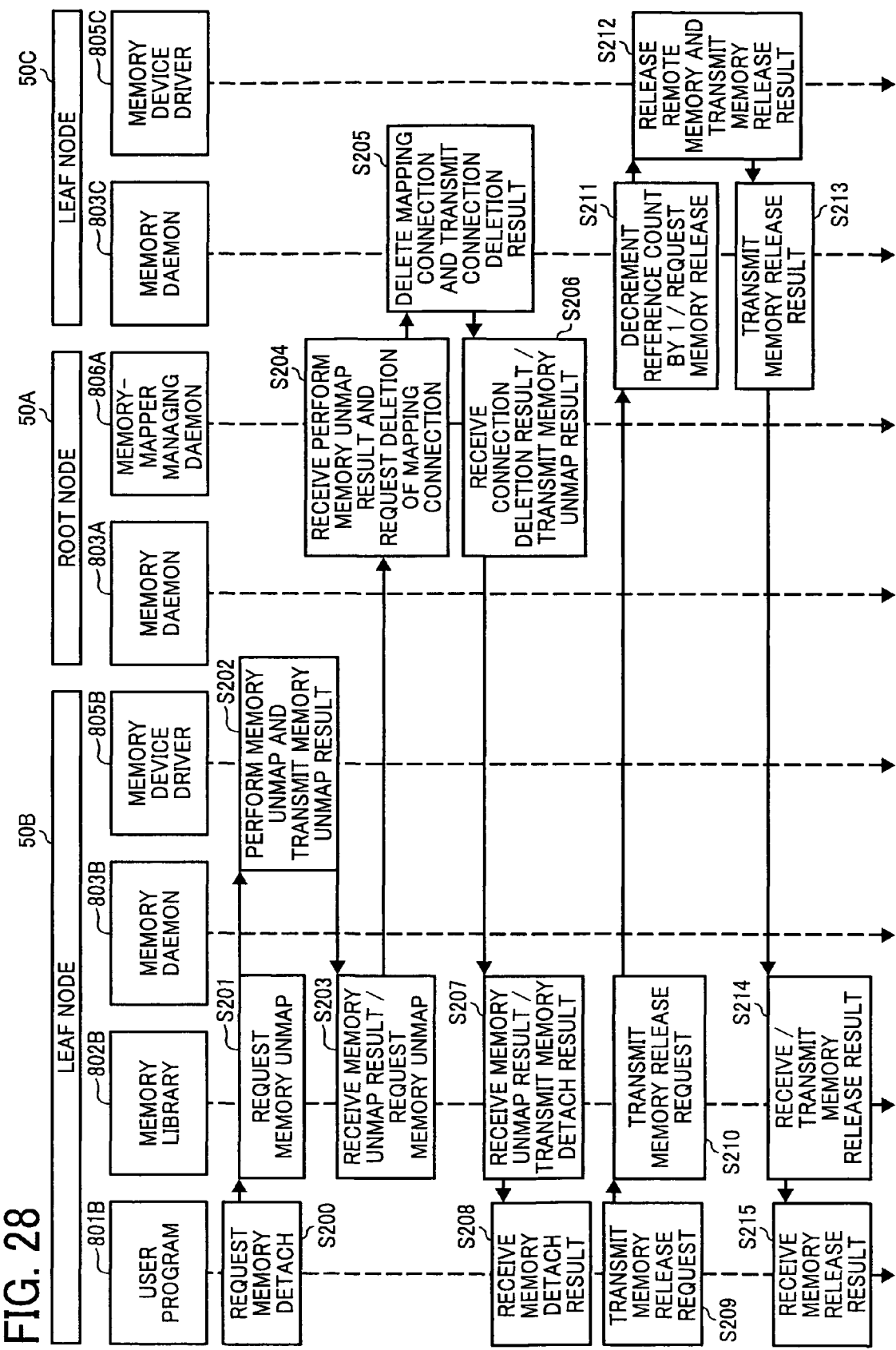
FIG. 28 is a sequence chart of a procedure of processing performed by the first leaf node to release the remote memory according to the embodiment.

FIG. 28 is a sequence chart of a procedure of processing performed by the first leaf node 50B to release the remote memory 602C. Explanation of steps same as those in the procedure of the processing described above may be omitted. A user program 801G transmits a shared memory key to the memory library 802B and requests the memory library 802B to detach a memory (Step S200). The memory library 802B requests the memory device driver 805B to unmap the memory (Step S201). A remote memory of an address stored in the shared-memory ID management table in association with a shared memory ID corresponding to the shared memory key as described above is a memory to be detached and unmapped. The memory device driver 805B performs memory unmap according to the request and transmits a memory unmap result indicating a result of the memory unmap to the memory library 802B (Step S202). The memory library 802B receives the memory unmap result and transmits a memory unmap request including the shared memory ID to the root node 50A (Step S203).

The memory daemon 803A of the root node 50A receives the memory unmap request. The memory daemon 803A transmits the shared memory ID to the memory-mapper managing daemon 806A and requests the memory-mapper managing daemon 806A to delete mapping connection (Step S204). The memory-mapper managing daemon 806A deletes the mapping connection according to the request and transmits a connection deletion result indicating a result of the deletion and including the shared memory ID to the memory daemon 803A (Step S205). The memory daemon 803A receives the connection deletion result and transmits a memory unmap result including the shared memory ID to the first leaf node 50B (Step S206).

The memory library 802B of the first leaf node 50B receives the memory unmap result and transmits a memory detach result including the shared memory ID to the user program 801B (Step S207). The user program 801B receives the memory detach result (Step S208). The user program 801B transmits a memory release request including the shared memory ID to the memory library 802B (Step S209). The memory library 802B transmits the memory release request including the shared memory ID to the second leaf node 50C (Step S210).

The memory daemon 803C of the second leaf node 50C receives the memory release request including the shared memory ID. The memory daemon 803C decrements a reference count stored in the memory-window management table in association with the shared memory ID by "1". The memory daemon 803C transits the shared memory ID to the memory device driver 805C and requests the memory device driver 805C to release a memory (Step S211). The memory device driver 805C releases, according to the request, a remote memory corresponding to the shared memory ID (the remote memory 602C) and transmits a memory release result indicating a result of the release of the remote memory to the memory daemon 803C (Step S212). The memory daemon 803C transmits the memory release result to the first leaf node 50B (Step S213).

The memory library 802B of the first leaf node 50B receives the memory release result and transmits the memory release result to the user program 801B (Step S214). The user program 801B receives the memory release result (Step S215). As a result, the remote memory 602C is released.

Procedures of processing performed by the memory library 802B, the memory daemons 803A and 803C, and the memory device drivers 805B and 805C in the processing shown in FIG. 28 are explained in detail.

Figure 29:
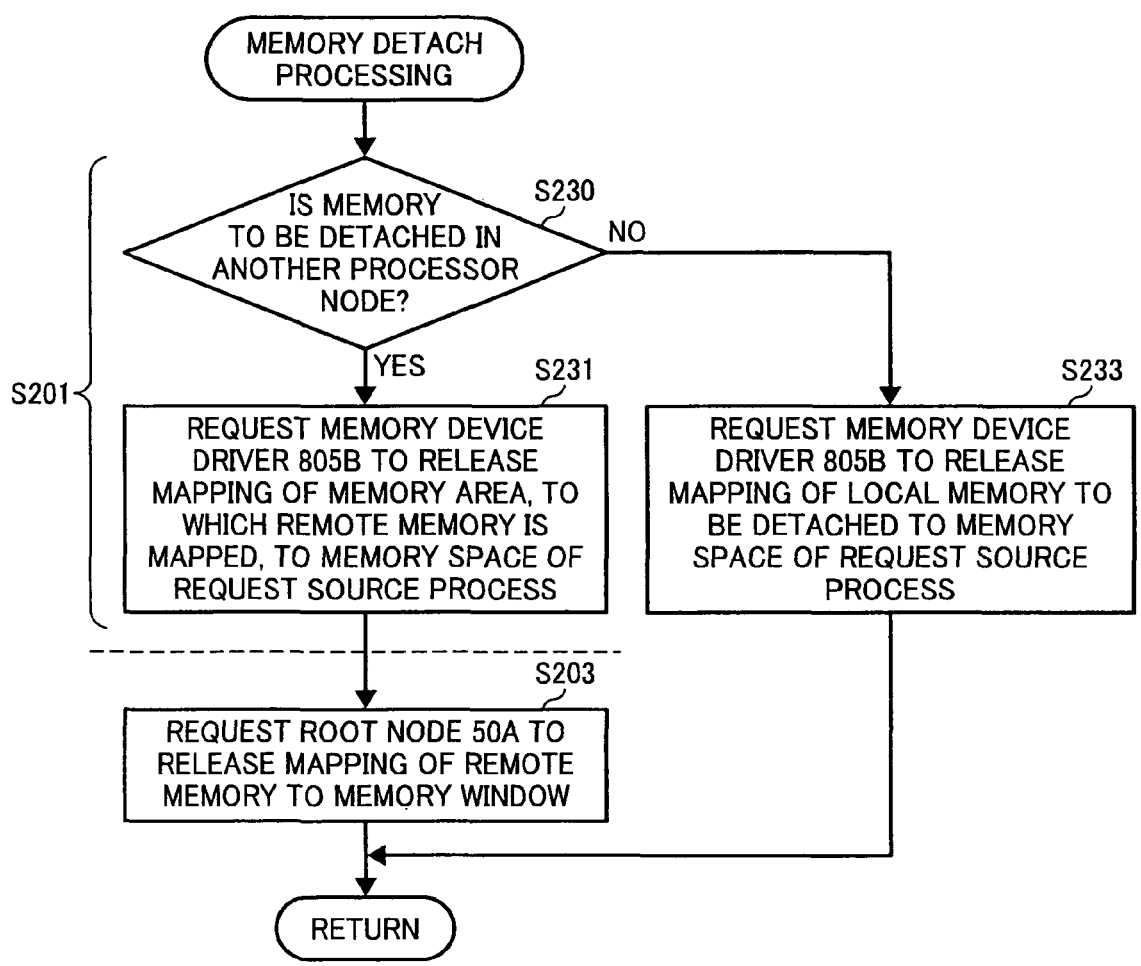
FIG. 29 is a flowchart of a detailed procedure of processing performed at Steps S201 and S203 by the memory library of the first leaf node according to the embodiment.

FIG. 29 is a flowchart of a detailed procedure of processing performed at Steps S201 and S203 by the memory library 802B of the first leaf node 50B. At Step S201, the memory library 802B receives the memory detach request from the user program 801B. The memory library 802B judges whether the memory to be detached is a memory of another processor node, i.e., whether a status is stored in the shared-memory management table as "in use" concerning the shared memory ID (Step S230). When a result of the judgment is affirmative, the memory library 802B requests the memory device driver 805B to release mapping of the address of the memory area, to which the remote memory 602C is mapped, to the memory space of the main memory 501B (Step S231).

At Step S203, the memory library 802B receives the memory unmap result from the memory device driver 805B that performs memory unmap according to the memory unmap request. The memory library 802B transmits a memory unmap request for requesting the remote memory 602C to release the mapping to the memory window 603B to the root node 50A.

When a result of the judgment at Step S230 is negative, the memory to be detached is a local memory, i.e., a remote memory allocated to the main memory 501B of the first leaf node 50B. In this case, the memory library 802B requests the memory device driver 805B to release the mapping of the address of the memory area of the main memory 501B to the memory space of the main memory 501B.

Figure 30:
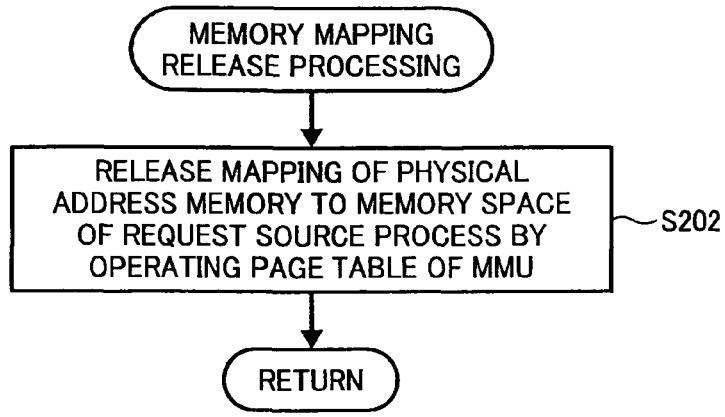
FIG. 30 is a flowchart of a detailed procedure of processing performed at Step S202 by the memory device driver of the first leaf node according to the embodiment.

FIG. 30 is a flowchart of a detailed procedure of processing performed at Step S202 by the memory device driver 805B of the first leaf node 50B. The memory device driver 805B is requested by the memory daemon 803B to perform memory unmap. The memory device driver 805B releases the mapping of the address of the memory area, to which the remote memory 602C is mapped, to the memory space of the main memory 501B.

Figure 31:
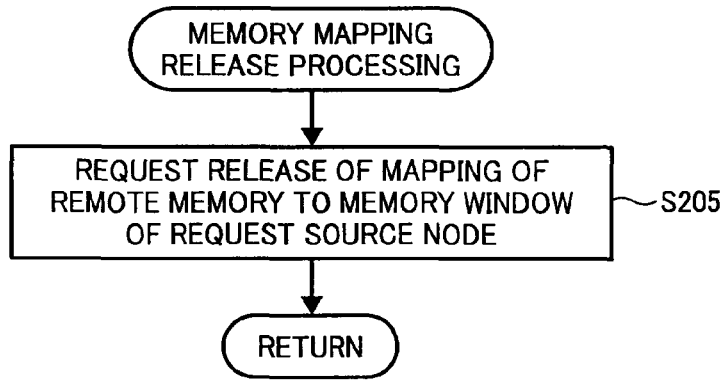
FIG. 31 is a flowchart of a detailed procedure of processing performed at Step S205 by the memory daemon of the root node according to the embodiment.

FIG. 31 is a flowchart of a detailed procedure of processing performed at Step S205 by the memory daemon 803A of the root node 50A. The memory daemon 803A receives the memory unmap request from the first leaf node 50B. The memory daemon 803A releases the mapping of the remote memory 602C to the memory window 603B.

Figure 32:
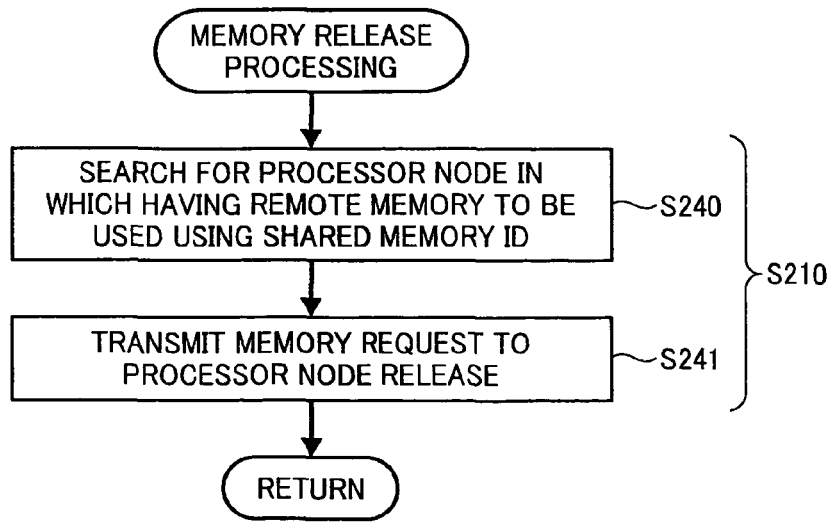
FIG. 32 is a flowchart of a detailed procedure of processing performed at Step S211 by the memory library of the first leaf node according to the embodiment.

FIG. 32 is a flowchart of a detailed procedure of processing performed at Step S210 by the memory library 802B of the first leaf node 50B. The memory library 802B receives the memory release request from the user program 801B. The memory library 802B searches for the processor node having the remote memory to be released using the shared memory ID included in the memory release request (Step S240). Specifically, the memory library 802B specifies the object processor node according to the remote node ID referring to a remote node ID stored in the shared-memory ID management table in association with the shared memory ID. The memory library 802B transmits the memory release request including the shared memory ID to the specified processor node (the processor node 50C) (Step S241).

Figure 33:
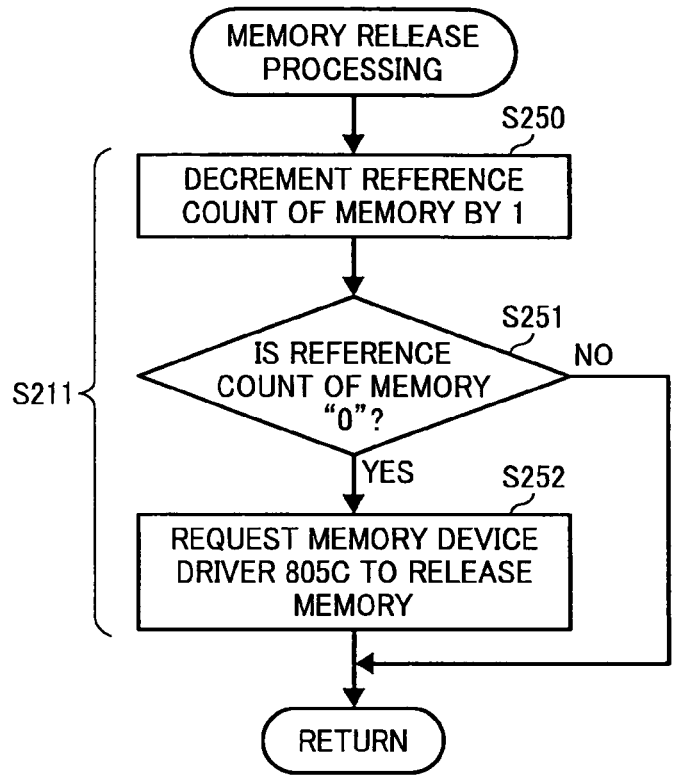
FIG. 33 is a flowchart of a detailed procedure of processing performed at Step S212 by the memory daemon of the second leaf node according to the embodiment.

FIG. 33 is a flowchart of a detailed procedure of processing performed at Step S211 by the memory daemon 803C of the second leaf node 50C. The memory daemon 803C receives the memory release request including the shared memory ID from the first leaf node 50B. The memory daemon 803C decrements a reference count stored in the shared-memory ID management table in association with the shared memory ID by "1" (Step S250). The memory daemon 803C judges whether the reference count is "0" (Step S251). When a result of the judgment is affirmative, the memory daemon 803C transmits an address corresponding to the shared memory ID and requests the memory device driver 805C to release a memory (Step S252). When a result of the judgment at Step S250 is affirmative, the use of the remote memory 602C in the second leaf node 50C is finished. In this case, the memory daemon 803C transmits the memory release result to the memory library 802C at Step S157 in FIG. 27.

Figure 34:
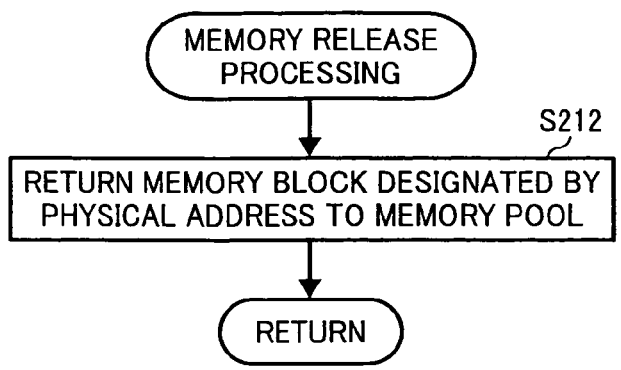
FIG. 34 is a flowchart of a detailed procedure of processing performed at Step S213 by the memory device driver of the second leaf node according to the embodiment.

FIG. 34 is a flowchart of a detailed procedure of processing performed at Step S212 by the memory device driver 805C of the second leaf node 50C. The memory device driver 805C receives the address from the memory daemon 803C and requested to release the memory. The memory device driver 805C returns a memory block designated by the address to the memory pool. The memory device driver 805C transmits the memory release result to the memory daemon 803C.

Figure 35:
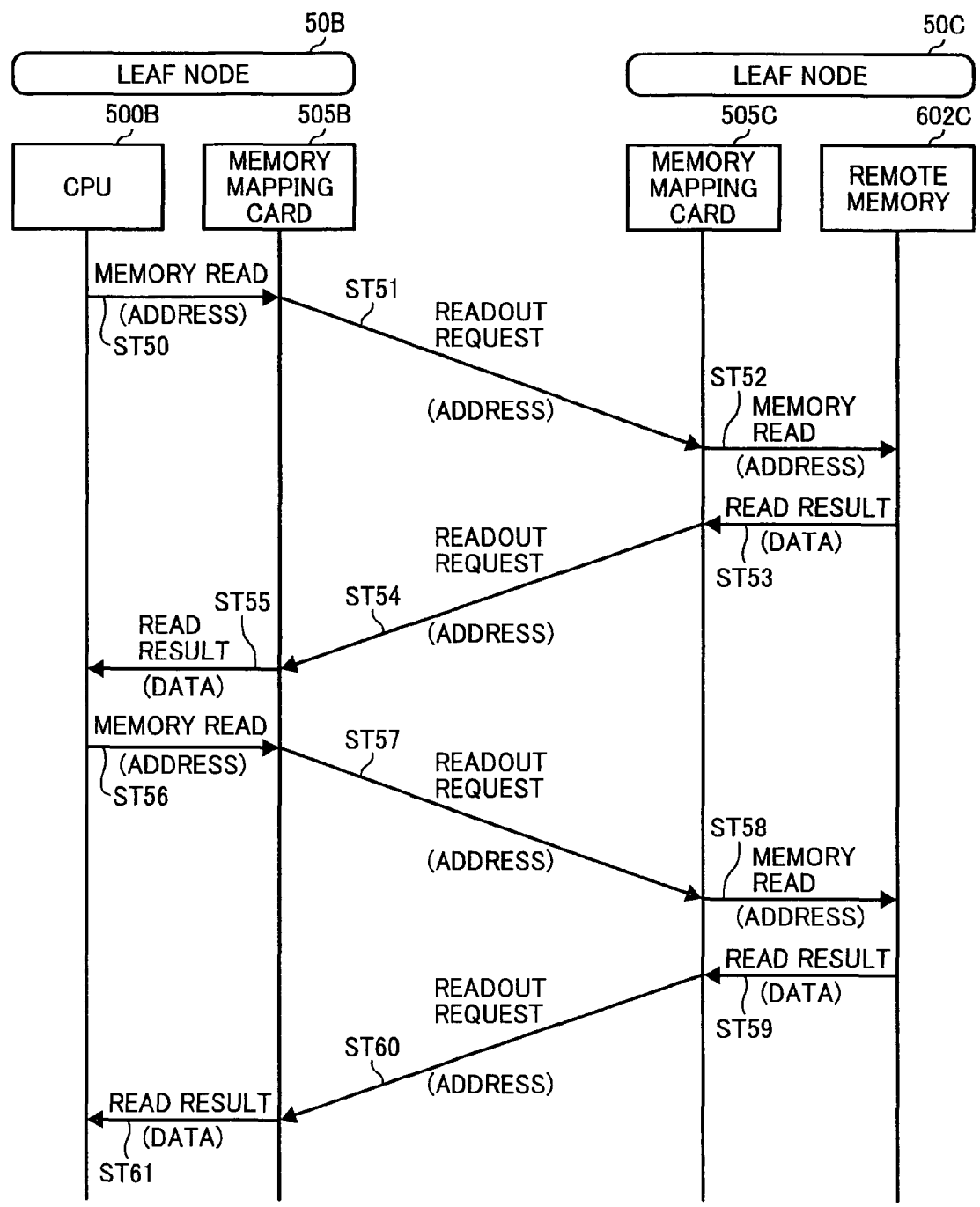
FIG. 35 is a simplified timing chart of a procedure of processing performed by a CPU of the first leaf node to read out data from the remote memory of the second leaf node according to the embodiment.

FIG. 35 is a simplified timing chart of a procedure of processing performed by the CPU 500B of the processor node 50B to read out data from the remote memory 602C of the processor node 50C.

The CPU 500B of the processor node 50B transmits, to acquire data stored in the remote memory 602C, a memory read request for requesting readout of the data to the memory mapping card 505B designating an address of the remote memory 602C (ST50). The CPU 500B stays on standby until a read result of the memory read is returned thereto. The memory mapping card 505B transmits, according to the memory read request, a readout request to the memory mapping card 505C of the processor node 50C designating an address of the remote memory 602C (ST51). The memory mapping card 505C reads out data stored in the designated address from the remote memory 602C of the main memory 501C (ST52) and acquires the data as a read result (ST53). After mapping the address, the memory mapping card 505C transmits a readout request including the mapped address to the memory mapping card 505B of the first leaf node 50B (ST54). The memory mapping card 505C receives the readout request. The memory mapping card 505C reads out the mapped data and transmits the data to the CPU 500B as a read result (ST55). The CPU 500B receives the read result. The CPU 500B transmits, to acquire data anew, a memory read request to the memory mapping card 505B designating an address of the remote memory 602 (ST56). Timing ST57 to ST60 after ST56 is the same as timing ST51 to ST55 described above.

As described above, the CPU 500B of the processor node 50B obtains the read result for the remote memory 602C. Even if the CPU 500B attempts to continuously apply memory read to the remote memory 602C, the CPU 500B cannot repeat the memory read at intervals smaller than round-trip latency between the processor nodes 50B to 50C. Therefore, performance during readout of data (a memory band width indicating how many data can be accessed per unit time; MB/s, etc.) falls.

Figure 36:
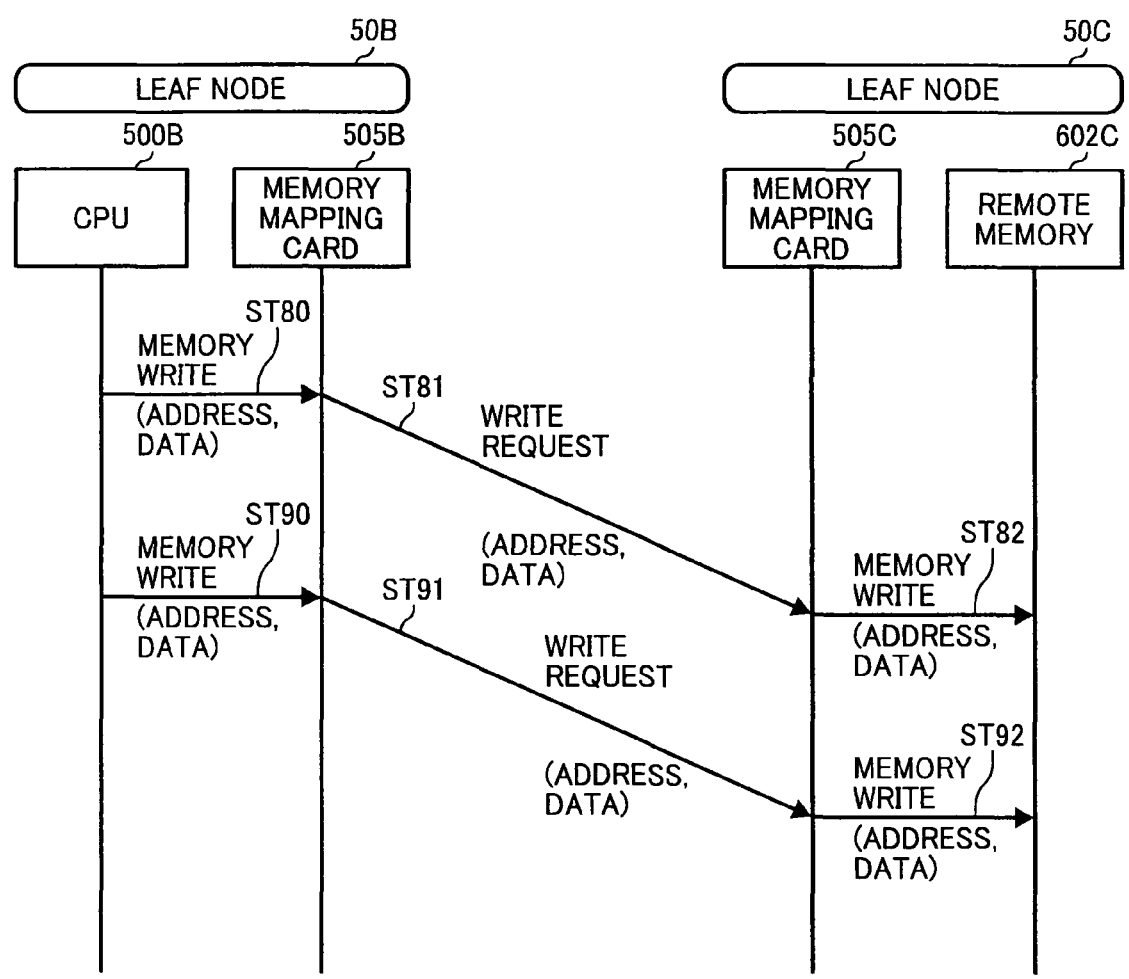
FIG. 36 is a brief timing chart of a procedure of processing performed by the CPU of the first leaf node to write data in the remote memory of the second leaf node according to the embodiment.

FIG. 36 is a brief timing chart of a procedure of processing performed by the CPU 500B of the processor node 50B to write data in the remote memory 602C of the processor node 50C. The CPU 500B of the processor node 50B transmits, to write data in the remote memory 602C, a memory write request for requesting writing of data to be written to the memory mapping card 505B together with the data designating an address of the remote memory 602 (ST80). The memory mapping card 505B transmits, according to the memory write request, a write request to the memory mapping card 505C of the processor node 50C together with the data to be written designating an address (ST81). The memory mapping card 505C writes the data to be written in the designated address of the remote memory 602C of the main memory 501C (ST82).

The CPU 500B does not wait for the memory write result in the processor node 50B. If there is next data to be written, the CPU 500B transmits a memory write request in the same manner (ST90). The following timing ST91 and ST92 is the same as timing ST81 and ST82. In other words, the CPU 500B can continuously repeat a data writing operation.

Therefore, in principle, performance during memory write is higher than that in readout of data.

Figure 37:
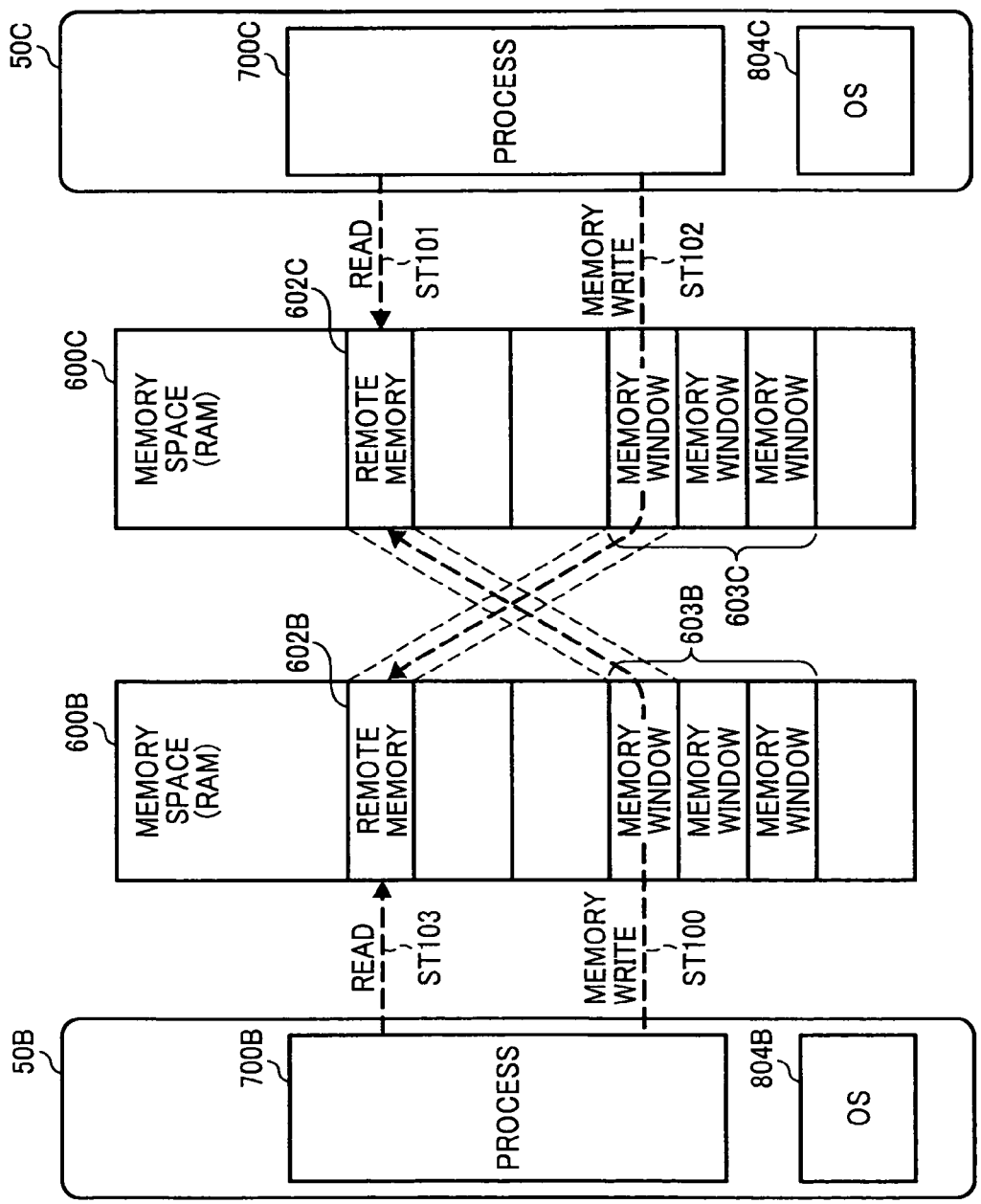
FIG. 37 is a diagram of a dataflow in exchanging a large amount of data bi-directionally between processes operating on the first leaf node and the second leaf node according to the embodiment.

An example of bidirectional exchange of a large amount of data between the first leaf node 50B and the second leaf node 50C via a remote memory is explained. Like the second leaf node 50C, the first leaf node 50B has a remote memory 602B in the main memory 501B. FIG. 37 is a diagram of a dataflow in exchanging a large amount of data bi-directionally between processes operating on the first leaf node 50B and the second leaf node 50C. In this example, the process 700B operating on the processor node 50B requests the process 700C operating on the processor node 50C to perform some processing and the process 700C returns a result of the processing to the process 700B. It is assumed that it is necessary to pass a large amount of data in requesting processing and returning a processing result.

First, the process 700B writes data to be processed in the remote memory 602C of the main memory 501C of the processor node 50C (ST100) and requests, using the socket communication, the process 700C to perform processing. The process 700C reads out the data to be processed from the remote memory 602C (ST101). The process 700C performs processing conforming to the processing request and writes a result of the processing in the remote memory 602B of the main memory 501B of the processor node 50B (ST102). When the processing is completed, the process 700C notifies the process 700B of the completion of the processing using the socket communication. The process 700B reads out the processing result from the remote memory 602B (ST103).

Figure 38:
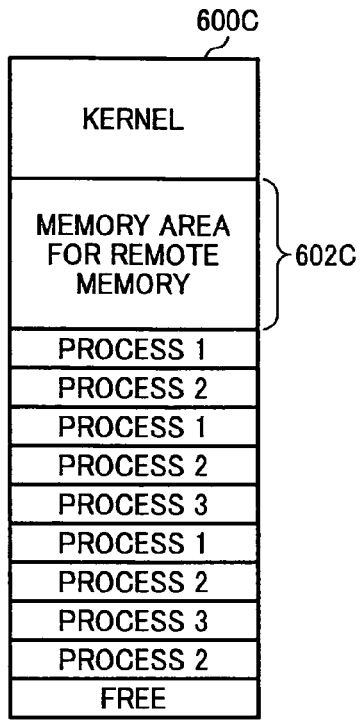
FIG. 38 is a diagram of an example of a state in which the memory device driver of the second leaf node secures a memory area for the remote memory as a memory pool such that physical addresses are continuous according to the embodiment.

FIG. 38 is a diagram of an example of a state in which the memory device driver 805C of the second leaf node 50C secures a memory area for the remote memory 602C as a memory pool such that physical addresses are continuous. In the figure, in a memory space 600C of the main memory 501C, physical addresses are continuously secured for the memory area (a memory page) of the remote memory 602. During the start or immediately after the start of the OS 804C, because fragmentation of a memory does not progress much, it is easy to secure a memory area in which physical addresses are continuous in this way. Therefore, at Step S2, a memory area of a necessary size is secured as the remote memory 602C during the start of the OS 804C. Consequently, when a request for memory allocation to the remote memory 602C is received from the first leaf node 50B later, it is guaranteed, by slicing a memory area of a requested memory size from a secured memory area, to always secure a memory area in which physical addresses are continuous. Because of the same reason, at Step S1 in FIG. 19, the first leaf node 50B secures a memory area for a remote memory of the first leaf node 50B in a memory space 600B of the main memory 501B.

Figure 39:
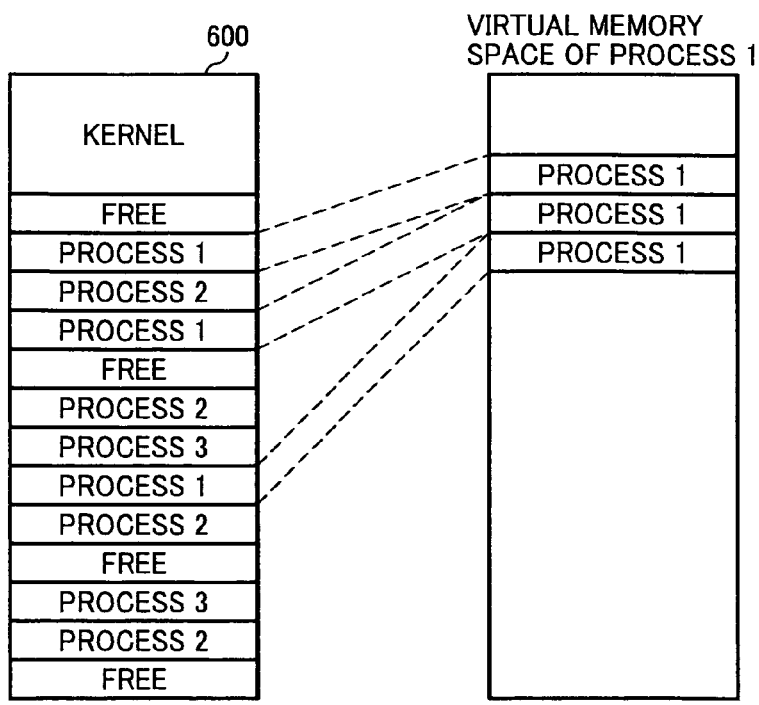
FIG. 39 is a diagram of a state in which a physical address of a free memory is fragmented in a memory space managed by an OS according to the embodiment.

FIG. 39 is a diagram of a state in which a physical address of a free memory is fragmented in the memory space 600 managed by the OS 804. As time elapses after the OS 804 is started, fragmentation of a physical address of a space memory occurs. Even when the fragmentation of the memory progresses in this way, the space memory can be mapped to an arbitrary address of a virtual memory space, in which a process operates, in page units by a paging function realized by the MMU of the CPU 500. Therefore, no trouble occurs in running the process. However, an access destination needs to be designated by a physical address for the remote memory 602 accessed via the memory mapping card 505. Therefore, when a memory area of a memory size exceeding a page size is secured as a remote memory, a memory area in which physical addresses are continuous is necessary. However, when the fragmentation of the free memory progresses as shown in FIG. 39, a memory area in which physical addresses are continuous cannot be secured. Therefore, as explained with reference to the example shown in FIG. 38, a memory area of a necessary size is secured as a remote memory in advance in the memory space 600 during the start of the OS 804.

Figure 40:
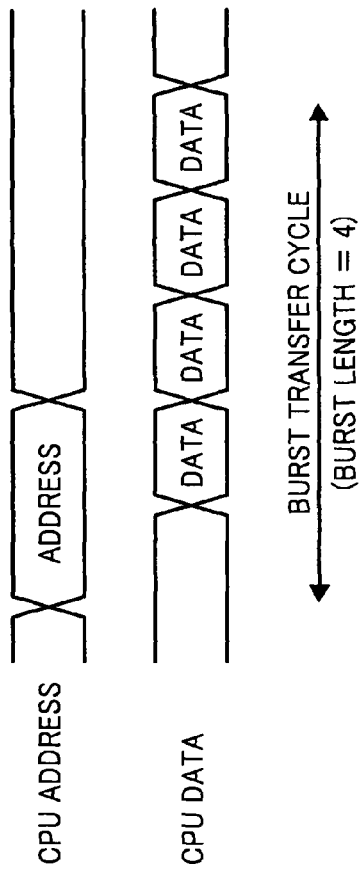
FIG. 40 is a diagram of a state of a bus cycle in continuous writing in a memory window performed by the CPU when the memory window is set as a collectively writable area according to the embodiment.

On the other hand, the memory window 603 to which the remote memory 602 is mapped is desirably set as a collectively writable area. FIG. 40 is a diagram of a state of a bus cycle in continuous writing in the memory window 603 performed by the CPU 500 when the memory window 603 is set as a collectively writable area. In this case, the CPU 500 issues a burst transfer cycle. For example, when a burst length is "4", the CPU 500 repeats a cycle of collectively transferring four data to one start address. Therefore, the performance of writing in the remote memory 602 is remarkably improved.

When a program writes data in the remote memory 602, a memory writing cycle is not issued to a PCI bus every time the program is written. A memory writing cycle in burst transfer is issued to the PCI bus when a certain number of write requests are accumulated in a write buffer. Therefore, efficiency of use of a bus band is remarkably improved compared with that during single transfer. The performance of writing in the remote memory 602 is also extremely satisfactory.

Figure 41:
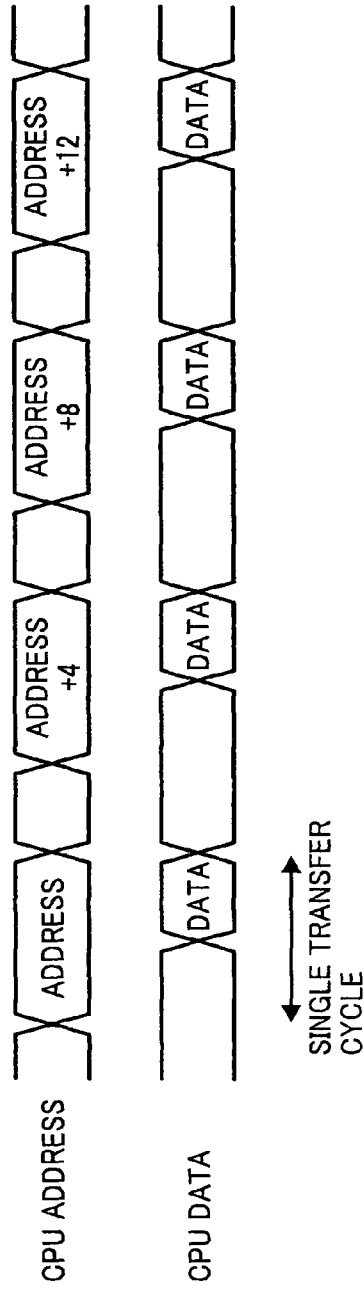
FIG. 41 is a diagram of a state of a bus cycle in continuous writing in the memory window performed by the CPU when the memory window is set as a collectively writable area according to the embodiment.

If the memory window 603 is set as a collectively writable area, the performance of writing significantly falls. FIG. 41 is a diagram of a state of a bus cycle in continuous writing in the memory window 603 performed by the CPU 500 when the memory window 603 is set as a collectively writable area. In this case, the CPU 500 repeats a single transfer cycle. In other words, the CPU 500 repeats a cycle of transferring one data to one start address. Therefore, efficiency of use of a bus band significantly falls in the PCI bus. As a result, the performance of writing in the remote memory 602 significantly falls.

In the embodiment described above, communication traffic generated in an access concerning memory mapping of a remote memory and traffic due to inter-process communication flow through the separate communication lines 51 and 52. Therefore, even when a large amount of data is read from and written in the remote memory, latency of the inter-process communication is not affected. It is possible to prevent processing efficiency of the entire multiprocessor system from falling.

One processor node (a root node) representing all the processing nodes unitarily manages memory mapping performed in the multiprocessor systems. Therefore, when a process attempts to set or change a mapping state of a remote memory, the process only has to transmit a memory mapping request to the root node. The processor node at a request source of the memory mapping request and the processor node at a request destination need to have a client-server relation. If the number of processor nodes is "n", a total number of combinations of the client-server relation is in an order of "O(n)". Therefore, even if the number of processor nodes increases, because a memory consumption does not increase much, it is possible to provide a multiprocessor system having high cost performance.

When the respective processor nodes manage memory mapping means of remote memories of the processor nodes as in the past, when a process operating on the processor node sets or changes a mapping state of a remote memory, the process needs to transmit a memory mapping request to the processor node that manages memory mapping means as an object of memory mapping. In this case, if the number of processor nodes is "n", a total number of combinations of a client-server relation between the processor node at a request source of the memory mapping request and the processor node at a request destination is in an order of "O(n2)". Therefore, as the number of nodes increases, the number of combinations of the client-server relation suddenly increases. It is necessary to secure a communication path, i.e., a socket between the processor nodes to have the client-server relation. Therefore, when the number of combinations of the client-server relation increases, consumption of a memory increases accordingly. This leads to an increase in cost. However, as described above, in the embodiment, such a deficiency can be suppressed.

The network communication means that can perform TCP/IP communication such as Ethernet is adopted as a communication line between the processor nodes. Therefore, it is possible to use the socket communication, which is inter-process communication means generally used in a UNIX (a registered trademark)-OS. This makes it easy to use a general open source and existing software resources and makes it possible to expect improvement in software development efficiency and a reduction in software development cost.

When a CPU writes a large amount of data in a remote memory via a memory mapping card, a burst transfer cycle is issued to a general-purpose bus such as a PCI bus or a PCI-Express. Therefore, it is possible to improve efficiency of use of the general-purpose bus. In the past, in such a case, the burst transfer cycle is not issued. Therefore, it is likely that the efficiency of use of the general-purpose bus falls and performance during writing in the remote memory falls to be lower than $1/10$ of logical performance of the general-purpose bus. However, in the embodiment, the performance during writing in the remote memory is maintained at a level close to the logical performance of the general-purpose bus. Therefore, it is possible to provide a multiprocessor system with high cost performance.

Separate memory buffers are used for transmission and reception to perform data communication bi-directionally between processor nodes and data is always written in the remote memory. Therefore, it is possible to prevent the influence of communication latency that occurs during readout from the remote memory. Even if data transfer is performed bi-directionally between the processor nodes, it is possible to efficiently perform inter-processor node communication. Therefore, it is possible to provide a multiprocessor system with high cost performance.

When a large amount of data are transmitted between the processor nodes, a process that operates in the processor node at a data transmission source requests another processor node to secure a memory area to thereby secure a memory area of the remote memory and write data to be transmitted in a remote memory on the other processor node via the memory mapping card. A process operating on the other processor node as a data reception destination can read out data from a remote memory secured by the process. An operation for readout from the remote memory is extremely fast compared with a writing operation. Therefore, processing efficiency for data transfer is improved. It is possible to provide a multiprocessor system with high cost performance.

A shared memory programming model generally used in the UNIX (a registered trademark)-OS can be used for performing communication of a large amount of data between the processor nodes via the memory mapping card. This makes it unnecessary to use a unique API set and makes it easy to use an open source and existing software resources. Therefore, it is possible to expect improvement of software development efficiency and a reduction in software development cost.

A memory area in which physical addresses are continuous is secured as a memory area for data transfer between the processor nodes during the start of an OS. Therefore, even if fragmentation of a free memory managed by the OS progresses, it is possible to use the secured memory area in which physical addresses are continuous. This makes it possible to guarantee data transfer between the processor nodes and provide a multiprocessor system with high reliability.

The present invention is not limited to the embodiment described above. Various modifications are possible as described below.

In the embodiment, various programs executed by the processor node according to the embodiment can be recorded in computer-readable recording media such as a compact disk-read only memory (CD-ROM), a flexible disk (FD), a compact disk-recordable, and a digital versatile disk and provided as files of an installable or executable format. The programs can be stored on a computer connected to a network such as the Internet and downloaded through the network to be provided.

In the embodiment described above, the processor node 50 includes the Ethernet card 504. However, instead of the Ethernet card 504, the processor node 50 can include a virtual Ethernet driver having a virtual network function. The virtual Ethernet driver is configured by software rather than hardware. The virtual Ethernet driver is a module that provides, while actually functioning as communication means for communicating data concerning memory mapping of a remote memory, a function equivalent to that of a real Ethernet device to a higher layer by emulating a function of an Ethernet device. A process can perform socket communication between arbitrary processor nodes by performing TCP/IP communication on the virtual Ethernet driver. With such a configuration, it is unnecessary to physically provide the communication line 51 and it is unnecessary to doubly prepare not only a cable used for communication but also all of a connector, a transmitter, a receiver, a communication interface chip, and the like. Therefore, it is possible to provide a multiprocessor system with high cost performance.

Figure 42:
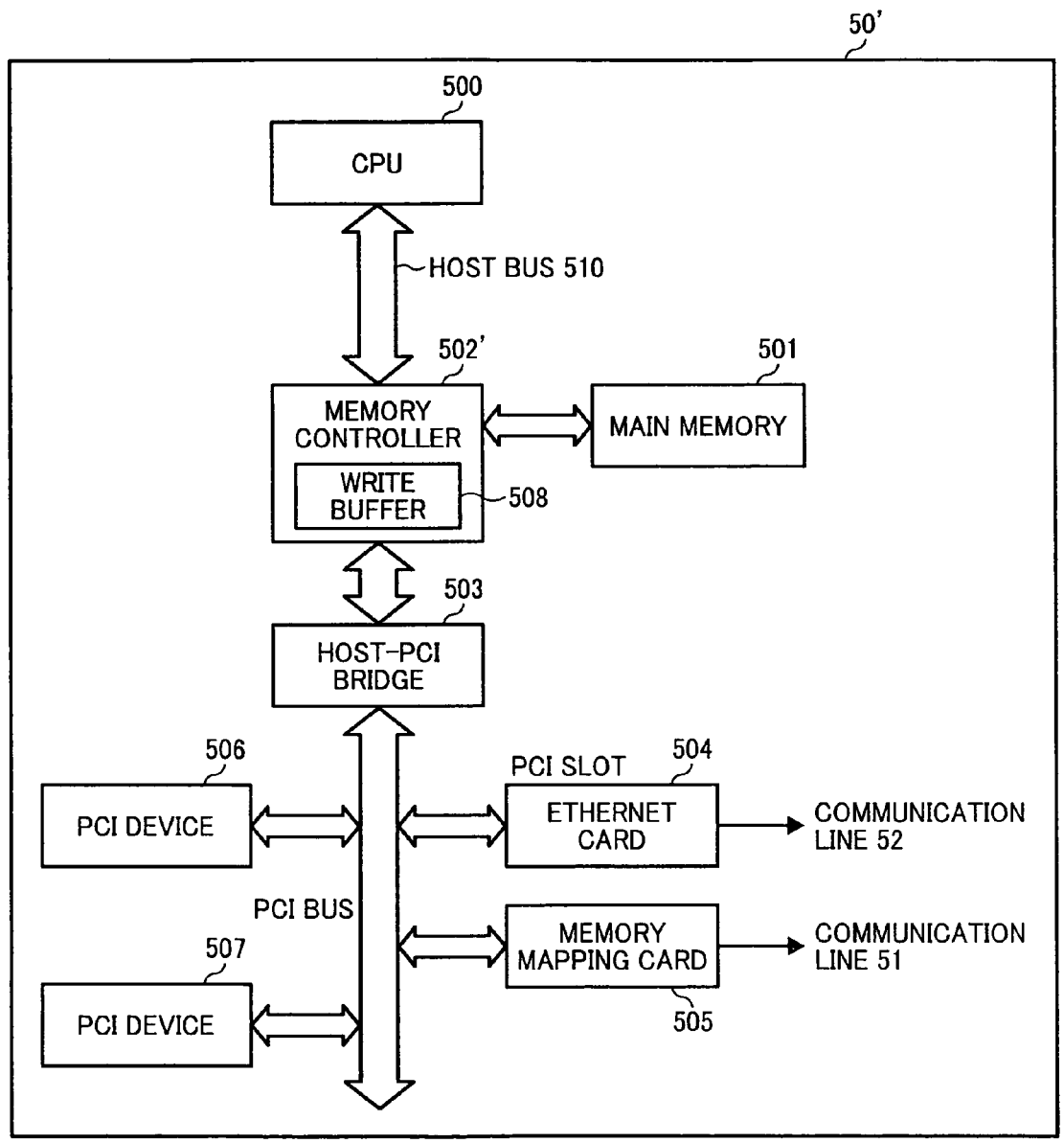
FIG. 42 is a diagram of a configuration example of a processor node in which a write buffer is provided in a memory controller according to the embodiment.

In the embodiment, in the processor nodes, a write buffer can be provided the memory controller or the CPU. FIG. 42 is a diagram of a configuration example of the processor node 50' in which a write buffer 508 is provided in a memory controller 502'. The write buffer 508 includes buffers at several stages that store a write request from the CPU 500 to the PCI device. The write buffer 508 has a function of comparing write addresses of write requests accumulated in the write buffer 508 and, when the write addresses are continuous addresses, issuing a burst transfer cycle to the host-PCI bridge 503.

Figure 43:
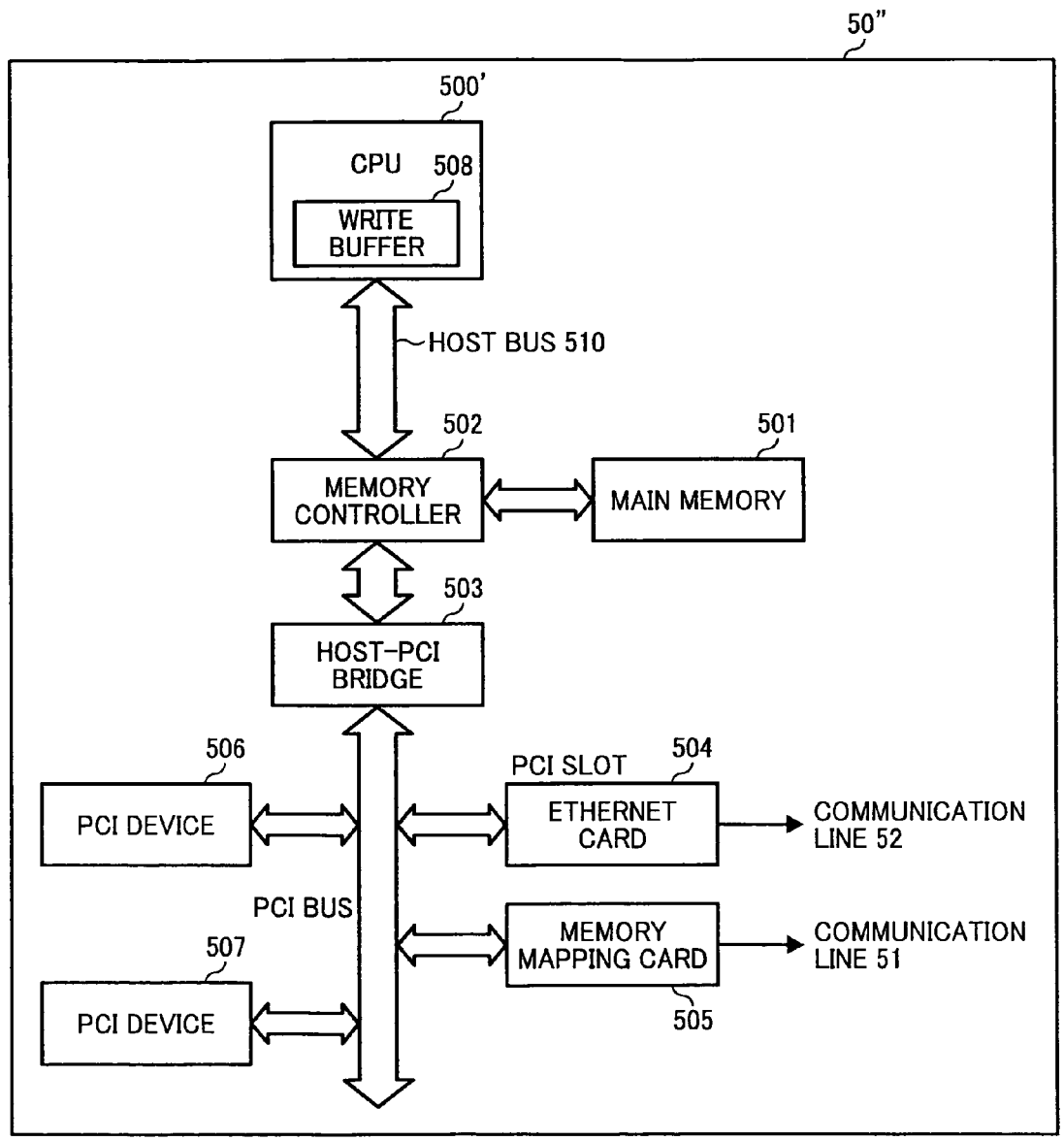
FIG. 43 is a diagram of a configuration example of a processor node in which the write buffer is provided in a CPU according to the embodiment.

FIG. 43 is a diagram of a configuration example of the processor node 50" in which the write buffer 508 is provided in the CPU 500'. The CPU 500' has a function of buffering a write request to the main memory 501 and an I/O device. The CPU 500' writes a predetermined set value in a specific register in the CPU 500' to thereby activate the write buffer 508 and realize a function of issuing a burst transfer cycle to the host-PCI bridge 503 for continuous write addresses.

In the embodiment described above, the processor node 50 can include a cache memory. In this case, the cache memory can be inactivated with respect to the memory window 603. FIG. 44 is a conceptual diagram of an example of an operation for disabling cache memories 900B to 900C with respect to the memory windows 603B and 603C when the processor node 50B has the cache memory 900B and the processor node 50C has the cache memory 900C. First, the CPU 500B of the processor node 50B writes data in an address of the remote memory 602C in the main memory 501C on the processor node 50C through the memory window 603B to which the remote memory 602C is mapped (ST110). The CPU 500C of the processor node 50C performs processing according to this data and writes data of a processing result in the remote memory 602C (ST111). The CPU 500B of the processor node 50B reads out the data written in the remote memory 602C (ST112). In this case, a copy of the data stored in the remote memory 602C is not stored in the cache memory 900C.

Therefore, even when there is no cache coherency maintaining mechanism that requires high cost for implementation, maintenance of coherency of a cache is guaranteed. Even when a plurality of processor nodes share a remote memory, maintenance of cache coherency is guaranteed. Therefore, because the processor nodes do no have to include cache coherency maintaining mechanisms, respectively, it is possible to reduce cost. Moreover, because traffic between CPUs for maintaining cache coherency is unnecessary, if the number of CPUs in the multiprocessor system is increased, it is possible to linearly improve the performance of the entire multiprocessor system.

The procedure described above is adopted because it is likely that problems described below occur when a cache memory 900 is activated with respect to the memory window 603. FIG. 45 is a conceptual diagram of an example of an operation for activating the cache memories 900B and 900C with respect to the memory windows 603B and 603C. The CPU 500B of the processor node 50B writes data in an address of the remote memory 602C through the memory window 603B (ST110). Because the cache memory 900 is active, the written data is stored in the cache memory 900B as well. The CPU 500C of the processor node 50C writes data of a processing result in an address same as the address in which the data is written by the CPU 500B (ST111). When there is no mechanism for maintaining coherency of a cache, the data of the processing result is not reflected on the cache memory 900B. Old data stored in the cache memory 900B is not inactivated. The CPU 500B reads out the data from the same address of the remote memory 602C (ST112). Because the data is read out from the cache memory 900B, the CPU 500B obtains the old data stored in the cache memory 900B at timing ST110 rather than the data actually written in the remote memory 602C, i.e., the data of the processing result written by the CPU 500C. When the cache memory 900 is activated with respect to the remote memory 602 in this way, it is not guaranteed that coherency of the cache is maintained. Therefore, it is likely that readout of illegal data from the cache memory 900 by the CPU 500 leads to malfunction of the multiprocessor system.

In the tightly-coupled multiprocessor system, the main memory only present in the processor node is shared by the processor nodes. Therefore, both program codes and data are inevitably stored on the main memory shared as the shared memory. The main memory is a very slow device in terms of clock speed of the CPU. Therefore, usually, cache memories are provided on the inside and outside of the CPU and, as long as readout of data from and writing of data in the main memory area hit in the cache memories, the main memory is not accessed. In this way, the performance of the CPU is maintained. Maintenance of coherency of content of the data poses a problem when the cache memories are provided. For example, as explained with reference to FIG. 45, when the CPU 500 obtains the old data stored in the cache memory 900 at timing ST112, cache coherency cannot be maintained. Usually, the CPU monitors bus cycles issued by CPUs of the other processor nodes or control information is exchanged among the CPUs to prevent such a deficiency from occurring. In this way, old data in the cache memories are inactivated to maintain the cache coherency. When the cache coherency is maintained, two problems described below are likely to occur. A complicated control circuit is necessary to realize a function of maintaining the cache coherency. Therefore, if a cache coherency maintaining mechanism is implemented in the CPU, cost of the CPU increases. When it is attempted to increase the number of CPUs in the multiprocessor system, communication traffic exchanged among the CPUs to maintain the cache coherency non-negligibly increases. Therefore, the performance of the entire multiprocessor system reaches the limit. However, if the cache memories are inactivated with respect to the main memory, in executing a program, because it is necessary to access the main memory every time when a program code most frequently accessed is fetched, it is likely that the performance of the CPU significantly falls. Therefore, as in the example shown in FIG. 44, the cache memories are not completely inactivated with respect to the main memory but are inactivated with respect to the memory window. This makes it possible to guarantee maintenance of the cache coherency without deteriorating the performance of the CPU and even when there is not cache coherency maintaining mechanism.

According to an aspect of the present invention, it is possible to make latency short and a processing load on a CPU relatively light. It is also possible to make a shared memory programming model usable and suppress a fall in development efficiency for software as much as possible.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A multiprocessor system comprising a plurality of processor nodes each including a memory having an independent memory space, wherein the processor nodes are connected via a plurality of communication lines, each of the processor nodes includes
a memory mapping unit that performs a memory mapping for mapping a part or whole of memories of other processor nodes to the memory space in the memory of the processor node as remote memories according to a request from a process operated by an execution of a program,
a first communication unit that performs a communication via a first communication line,
a second communication unit that performs a communication via a second communication line,
a first processor node, which is one of the processor nodes, further includes a memory-mapping managing unit that creates a mapping connection between a processor node and other processor nodes upon the memory mapping unit performing the memory mapping,
the memory mapping unit transmits a memory allocation request for requesting allocation of the remote memories to the memory mapping units of the other processor nodes via the second communication unit, and transmits a connection creation request for requesting creation of the mapping connection to the memory-mapping managing unit of the first processor node via the second communication unit, and the memory-mapping managing unit creates the mapping connection between the processor node and the other processor nodes according to the connection creation request transmitted from the memory mapping unit, and then transmits a memory mapping instruction for instructing execution of the memory mapping to the memory mapping unit via the first communication unit of the first processor node.

2. The multiprocessor system according to claim 1, wherein when allocation of the remote memories is requested, the memory mapping units of the other processor nodes allocate a part or whole of memory areas of the memories of the other processor nodes as the remote memories and transmit a memory allocation result including addresses of the memory areas to the memory mapping unit via the second communication units of the other processor nodes.

3. The multiprocessor system according to claim 2, wherein
the memory mapping unit transmits the memory allocation request to the other memory mapping units via the second communication unit, and then transmits, when the memory allocation result including the addresses of the memory areas transmitted by the memory mapping units of the other processor nodes is received, the connection creation request including the addresses of the memory areas to the memory-mapping managing unit via the second communication unit, and
the memory-mapping creating unit creates, according to the connection creation request transmitted by the memory mapping unit, the mapping connection by mapping the addresses of the memory areas to an address of a memory window set for the processor node, and then transmits, via the first communication unit of the first processor node, a memory mapping instruction for instructing execution of the memory mapping to the memory mapping unit.

4. The multiprocessor system according to claim 3, wherein the memory mapping unit performs, when the memory mapping instruction transmitted by the memory-mapping managing unit is received via the first communication unit, the memory mapping by mapping the addresses of the memory areas to the address of the memory window in the memory space of the memory of the processor node.

5. The multiprocessor system according to claim 4, wherein the memory mapping unit performs, when the memory mapping instruction transmitted by the memory-mapping managing unit is received via the first communication unit, the memory mapping by mapping the addresses of the memory areas to the memory space of the memory of the processor node and a virtual memory space generated by the process.

6. The multiprocessor system according to claim 5, wherein
each of the processor nodes further includes a control unit that controls the processor node by reading and executing an operating system stored in a storing unit, and
the other memory mapping units secure, during start of the operating system, a memory area in which addresses are continuous in the memory, allocates, when the allocation of the remote memories is requested by the memory mapping unit, a part or whole of a secured memory area as the remote memories, and transmits a memory allocation result including an address of the memory area to the memory mapping unit via the second communication units of the other processor nodes.

7. The multiprocessor system according to claim 6, wherein
the memory mapping unit transmits, via the second communication unit, a memory allocation request for requesting allocation of the remote memories designating their memory sizes to the memory mapping units of the other processor nodes, and the memory mapping units of the other processor nodes allocate, when allocation of the remote memories with the memory sizes designated is requested, a memory area of the memory size as a remote memory and transmits a memory allocation result including an address of the memory area to the memory mapping unit via the second communication units of the other processor nodes.

8. The multiprocessor system according to claim 7, wherein the memory mapping unit includes a memory library that provides an application program interface equivalent to an application program interface used when a shared memory function included in a System V IPC is realized.

9. The multiprocessor system according to claim 8, wherein a part or whole of the memory window is a collectively writable memory area.

10. The multiprocessor system according to claim 9, wherein
the processor nodes are connected in peer-to-peer, and
the first processor node and the processor nodes other than the first processor node are connected in a relation of a server and clients.

11. The multiprocessor system according to claim 10, wherein the second communication line is a network communication line for performing a communication according to a predetermined communication standard.

12. The multiprocessor system according to claim 1, wherein
the processor node further includes
a central processing unit that transmits a write request for requesting writing of data to an input/output device,
a host bus to which the central processing unit is connected,
a general-purpose bus to which the input/output device is connected,
a host bus bridge to which the host bus and the general-purpose bus are connected, and
a write buffer provided between the central processing unit and the host bus bridge, and
the write buffer buffers the write request transmitted from the central processing unit and issues a burst transfer cycle to the general-purpose bus.

* * * * *